(12) United States Patent
Yoon

(10) Patent No.: US 7,971,155 B1
(45) Date of Patent: Jun. 28, 2011

(54) DROPDOWN WIDGET

(76) Inventor: Hyoungsoo Yoon, Sunnyvale, CA (US)

( * ) Notice: Subject to any disclaimer, the term of this patent is extended or adjusted under 35 U.S.C. 154(b) by 774 days.

(21) Appl. No.: 11/875,907

(22) Filed: Oct. 21, 2007

Related U.S. Application Data

(60) Provisional application No. 60/862,450, filed on Oct. 22, 2006.

(51) Int. Cl.
G06F 3/048 (2006.01)
(52) U.S. Cl. .................................................. 715/843
(58) Field of Classification Search .................. 715/810, 715/825, 835, 842, 843, 780, 841
See application file for complete search history.

(56) References Cited

U.S. PATENT DOCUMENTS

| | | | |
|---|---|---|---|
| 4,862,390 A | 8/1989 | Weiner | |
| 5,041,967 A | 8/1991 | Ephrath et al. | |
| 5,263,174 A | 11/1993 | Layman | |
| 5,276,797 A | 1/1994 | Bateman et al. | |
| 5,625,783 A | 4/1997 | Ezekiel et al. | |
| 5,781,193 A | 7/1998 | Alimpich et al. | |
| 5,867,162 A | 2/1999 | O'Leary et al. | |
| 6,011,555 A * | 1/2000 | Eckhoff et al. | 715/843 |
| 6,208,340 B1 | 3/2001 | Amin et al. | |
| 6,564,225 B1 * | 5/2003 | Brogliatti et al. | 1/1 |
| 6,727,921 B1 | 4/2004 | Velad | |
| 6,734,882 B1 | 5/2004 | Becker | |
| 6,734,883 B1 | 5/2004 | Winn et al. | |
| 6,847,387 B2 | 1/2005 | Roth | |
| 6,983,271 B2 | 1/2006 | Morrow et al. | |
| 7,036,092 B2 | 4/2006 | Sloo et al. | |
| 7,080,325 B2 | 7/2006 | Treibach-Heck et al. | |
| 7,100,120 B2 | 8/2006 | Zimmerman et al. | |
| 2002/0167548 A1 | 11/2002 | Murray | |
| 2004/0001109 A1 | 1/2004 | Blancett et al. | |
| 2004/0128309 A1 | 7/2004 | Gurney et al. | |
| 2006/0161864 A1 | 7/2006 | Windl | |
| 2008/0071771 A1 * | 3/2008 | Venkataraman et al. | 707/5 |
| 2009/0119289 A1 * | 5/2009 | Gibbs et al. | 707/5 |

* cited by examiner

Primary Examiner — Thanh T Vu

(57) ABSTRACT

A data processing system and method of presenting data on a graphical user interface. A dropdown widget with multiple lists is provided. According to an embodiment, items are grouped into multiple lists, and the lists are presented in an alternating or cyclic fashion in response to a user input. In a certain embodiment, a particular list may be selected for display by choosing the corresponding button on a widget. In some cases, multiple lists may be displayed at the same time. The present invention enables the user to select one or more items from mutually exclusive or hierarchically organized lists.

15 Claims, 21 Drawing Sheets

252a

254a

Beethoven

Beetles

Rolling Stones

Michael Jackson

. . .

256

402

The Incredibles

404

Monsters Inc.

Shreck 2

Chicken Run

. . .

406

Pearl Jam

Nirvana

U2

. . .

408

902

User Preferences

[1] Favorite Genres

Action and Adventure

Comedy

Drama

Mystery and Thriller

Animation

. . .

DROPDOWN WIDGET

CROSS REFERENCE

The present application claims priority to U.S. Provisional Patent Application No. 60/862,450 filed on Oct. 22, 2006 and entitled "Dropdown List Control", which is incorporated herein by reference in its entirety; this application hereby claims the benefit of this provisional application under 35 U.S.C. §119(e).

BACKGROUND OF THE INVENTION

1. Field of the Invention

The present invention generally relates to a data processing system. More particularly, the present invention pertains to a graphical user interface component.

2. Description of the Related Art

A graphical user interface (GUI) has become one of the most widely used mechanisms in which the user interacts with a data or information processing and/or communications system such as a personal computer (PC) or a personal digital assistant (PDA), or a cellular phone, etc. This is partly due to the recent progress in information technologies, both in software and hardware areas, and this is also partly due to the wide recognition of the benefits with which the (well-designed) graphical user interface provides the user in terms of the usability and accessibility, etc. In the graphical user interface paradigm, in the so-called windowing systems in particular, the user interacts with a computer (or other data processing/communications devices) through one or more special areas in the display screen(s), typically of rectangular shapes, called windows. Windows can be opaque or semi-transparent. A special window that covers the whole display screen is generally known as a "desktop" (e.g., in a window system of personal computers). Some windows are configured to display textual or graphical content within their boundaries, such as edit windows used in word processing applications. Other various types of special-purpose or "stock" graphical user interface components, or widgets or controls (or, common controls), are also included in most GUI toolkits or libraries or in most operating systems that natively support graphical user interfaces. (For example, Microsoft Windows, Apple Macintosh, various X-Window based window systems on Unix platforms, and other GUI systems on virtual machines such as Java Swing, Microsoft .Net framework, etc., and Palm, Symbian, and other operating systems for handheld devices or mobile handsets, etc.)

One of the most commonly used GUI controls is a so-called dropdown or dropdown list widget. A typical dropdown list consists of an edit box and a (pull-down) list. An item from the pull-down list may be selected and displayed on the edit box, which may or may not be editable by an end user. An item may also be added to the list either programmatically or by the user (e.g., by adding the item into the (editable) edit box). The list part may be made visible ("pulled down") or hidden ("closed") by clicking on the (non-editable) edit box or on a button (typically drawn with a downward arrow) which is usually included in the dropdown list widget. In a typical graphical user interface (GUI) system, only one item may be selected (and displayed through the edit box area). Change of the selected item in the edit box (either in response to user input or initiated programmatically based on other conditions or events, etc.) typically triggers an event, which may be used, for example, to control the behavior of other widgets or to perform certain predefined operations (e.g., through callback functions). The dropdown list control, or simply dropdown control, is sometimes called a combo-box because it provides the combined functionalities of an edit control and a list control (or other type of component). It should be noted, however, that the combo-box control is a single widget in all common graphical user interface systems, libraries, or frameworks, for example, with a well-defined interface (e.g., an application programming interface, or API). In certain implementations, the list control part may always be displayed along with the edit control part (e.g., instead of being toggled between the hidden and pulled-down states). Other variations are also found.

FIG. 1A shows a dropdown list control, or a combo-box, in prior art. The control is displayed in a "closed" state, 102*a*. The control 102*a* includes an edit box portion 104 and a pull-down/pull-up (or, show/hide) button 106. The control is typically associated with a list of items (e.g., data) that can be displayed through this graphical user interface widget. The list may come from various data sources such as a document on a file system or a table in a database, etc. The list may also be transient and temporarily constructed (e.g., through a predefined algorithm, etc.) and stored in a volatile memory in the data processing system. When the button 106 is pressed (or, triggered by other mechanisms such as hovering a mouse pointer over a certain part of the widget, etc.), the associated list is displayed (typically, below the edit box), as shown in FIG. 1B. The control is in an "open" or pulled-down state, 102*b*, with the list box part 108 open in this figure. The "dropped-down" list 108 includes zero or more items 110. The ellipsis is shown in the figure to indicate the drawing is just a partial/schematic representation of the control. When an item is selected (e.g., using a pointer, etc.), the selected item replaces the item displayed in the edit box area 104. A certain additional (predefined) operation may be triggered based on a selection-change event in some applications. The list box may also be closed/hidden (e.g., without changing the selected item, etc.) by using the toggle button 106. In some implementations, the items in the list may be deleted and/or new items may be added to the list (e.g., programmatically, or in response to user input, etc.). In an implementation where the edit box is "editable", a new item may be added through the edit box area (e.g., by typing in a new item and pressing Enter key, etc.) by the user. The newly added item through the user interface may then be inserted to the original list in the data source.

A related graphical user interface component is a menu control, or a menu bar/strip, which usually consists of one or more menu items. Menu items are typically organized in a hierarchical fashion, and they are designed to trigger certain associated actions when activated (e.g., in response to a user selection). Selecting a non-leaf menu item (e.g., similar to a folder) typically "pulls down" (or, hides) its child menu items (e.g., in the downward direction, or to the right, etc.), in a similar way that a list is displayed (or, hidden) when the combo box is toggled. Selecting a leaf menu item usually issues an associated command which is to perform a predefined function. Unlike the dropdown list component, however, the menu control is primarily used to trigger or issue an action rather than to select an item, and the menu control does not generally change the (parent menu's) label in response to selecting a (child) menu item. FIG. 2A shows a (horizontal) menu bar or menu strip control 152*a* in the prior art. The (top-level) menu control shown in the figure is in a "closed" state, and it comprises three menu items 154, "File", "Edit", and "View". Menu items can be "opened" by clicking or hovering on the menu items (or, areas on or surrounding the associated labels) using a mouse pointer, or by activating certain predefined keyboard shortcuts. FIG. 2B illustrates the menu bar control 152b in an open or dropped-down state. The "Edit" menu has been pulled down, and its child menu (or, submenu) 156 is displayed below the menu bar. The (vertically arranged) submenu bar 156 includes one or more menu items 158, each of which may open up another submenu or fire up an associated command or action, when activated. Labels of menu items are typically non-editable (e.g., by the user). A menu bar or a submenu bar may be closed either explicitly (e.g., by clicking on the menu, etc.) or implicitly (e.g., automatically when a user interacts with different widgets other than the menu, etc.). Certain aspects of the present invention may apply to a menu control as well as to a dropdown list control, even though our discussion may only refer to a dropdown list control in some cases.

A typical implementation of the dropdown list widget in the prior art is designed to pick an item from a single list of data associated with the widget, add an item to the list, or otherwise manipulate the data in the list. In some cases, the data may be organized into hierarchical lists, such as in the case of a menu component that includes submenus, but each menu (or, submenu) is still associated with a single list (e.g., its child menu items). In certain implementations, the list may be filtered, or otherwise dynamically manipulated, but they still deal with one list. There are cases, however, in which being able to organize items in more than one list (or, select an item from the multiple lists, for example, from different data sources, etc.) is desirable. For instance, listing hundreds or thousands of cities in the United States in one list may not be the most convenient way to organize and/or present the data to the user. Instead, it may be more user-friendly if the cities are grouped, for example, into states and presented in multiple (shorter) lists.

BRIEF SUMMARY OF EXEMPLARY EMBODIMENTS

Certain embodiments of the present invention provide methods and apparatuses for presenting a set of data on a graphical user interface (GUI). In particular, a dropdown widget with multiple lists is provided. According to an embodiment of the present invention, selection items are grouped into multiple lists, and the lists are presented in a certain preset order, for example, in response to a user input. In some embodiments, a list may be selected by using a toggle button on a widget, e.g., in a cyclic fashion. In some other embodiments, a particular list may be selected by choosing the corresponding button from multiple buttons, or by clicking on a particular area of the widget. Certain selected lists may also be presented based on the context or based on user preferences. Two or more lists may be displayed at the same time. Embodiments of the present invention can be used to enable the user to select items from two or more mutually exclusive or hierarchically organized lists.

According to an embodiment of the present invention, a multi-list combo-box control is provided. The graphical user interface component comprises an edit or text box area and one or more list boxes. A list may be selected and pulled down using a toggle button. In some embodiments, lists are displayed in a cyclic way, for example, when the dropdown button is pressed or a pointer is hovered over the button. In some embodiments, a list may be explicitly selected using a certain user interface such as a built-in spin control or multiple buttons. In certain cases, lists may be filtered and only a set of selected/pre-filtered lists may be accessed by the user. Items in lists may also be filtered in certain implementations. In a certain embodiment, one or more lists may be simultaneously displayed, either overlapped or concatenated.

Embodiments of the present invention may be used for displaying items from mutually exclusive lists (e.g., an item is either an email address or a telephone number, etc.) or from multiple folders or categories (e.g., bookmarks belonging to different folders, etc.). Embodiments of the present invention may also be used for displaying items from hierarchically organized lists. For example, the US cities may be grouped into 50 states (either beforehand when storing the data or on-the-fly when presenting them on the user interface, etc.) and they may be displayed through a GUI widget embodiment of the present invention. Certain embodiments may be used for displaying context-dependent lists (e.g., for selecting an item(s) from one or more lists, etc.). For example, context-sensitive help (or, help topics, help categories, etc.) may be presented to a user, which the user may cycle through to find the right help topic he or she is looking for. Embodiments of the present invention may also be used for displaying items classified in terms of their attributes (e.g., based on relevant dates, etc.) or items simply divided into multiple groups (e.g., alphabetically, etc.). In a certain embodiment, multiple items may be selected (e.g., one from each separate list, etc.). For example, three color components may be selected from three color palettes (e.g., for R, G, and B colors) included in a single multi-list combo-box widget.

Therefore, as summarized herein, the present invention provides, among other things, a graphical user interface control with multiple drop-down or pull-down lists. These and other embodiments, features, aspects, and advantages of the present invention will be apparent from the accompanying drawings and from the detailed description and appended claims which follow.

BRIEF DESCRIPTION OF THE DRAWINGS

The novel features of the present invention are set forth in the appended claims. The invention itself, however, as well as preferred modes of use, and advantages thereof, will best be understood by reference to the following detailed description of illustrative embodiments when read in conjunction with the accompanying drawings, wherein:

DETAILED DESCRIPTION

Figure 1A:
FIG. 1A shows a dropdown list control in prior art. The control is in a "closed" state.
Figure 1B:
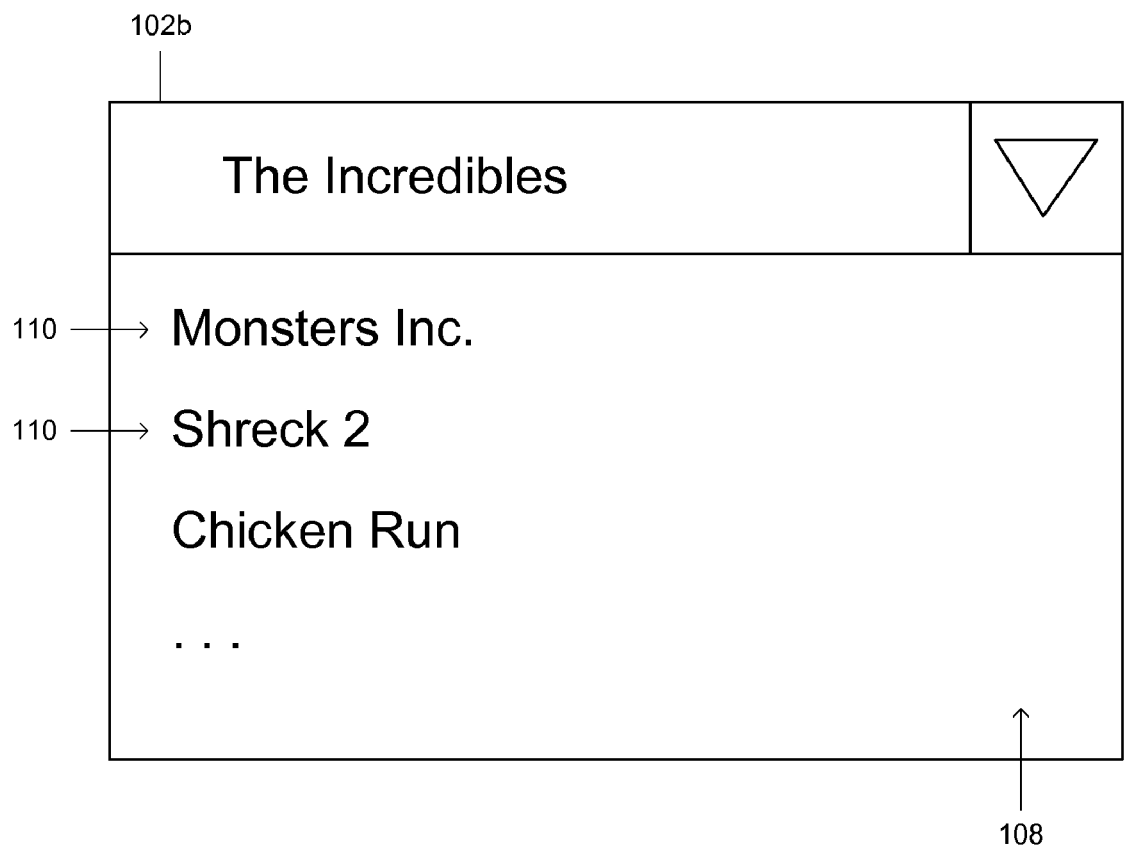
FIG. 1B shows a dropdown list control in prior art. The control is in an "open" or pulled-down/dropped-down state.
Figure 2A:
FIG. 2A shows a menu control in a prior art. The control is in a "closed" state.
Figure 2B:
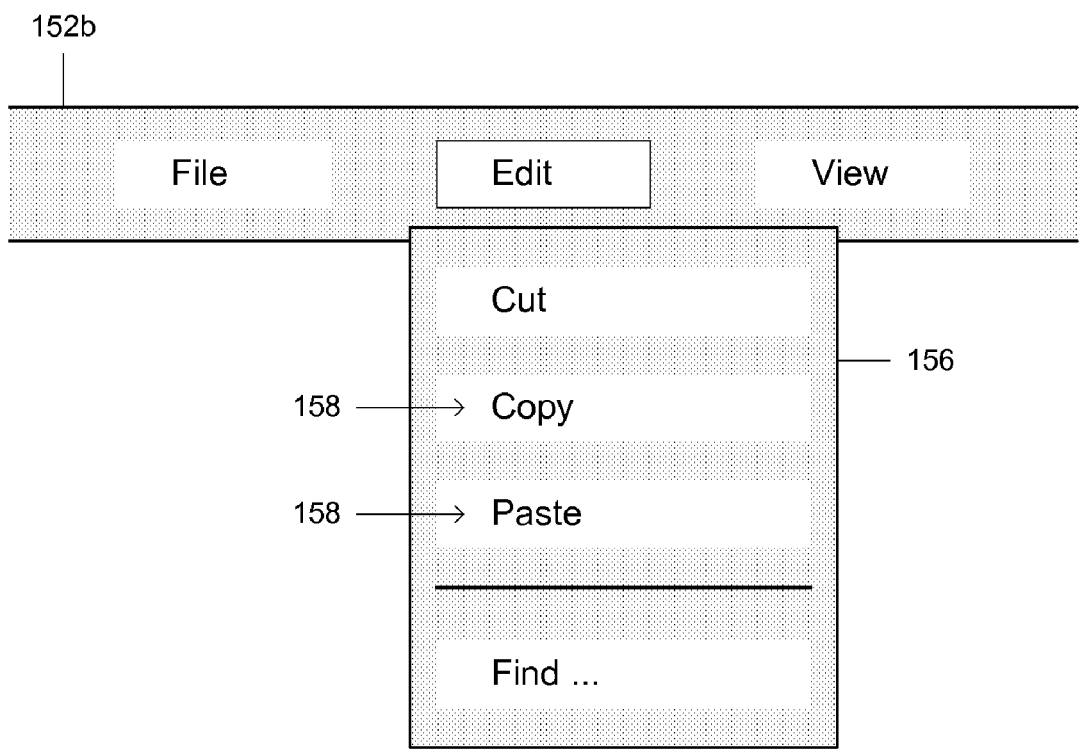
FIG. 2B shows a menu control in a prior art. The control is in an "open" or pulled-down/dropped-down state.

The present invention will now be described more fully hereinafter with reference to the accompanying drawings, in which various exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Likewise, for purposes of explanation, numerous specific details are set forth in the following description in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention. Parts of the description may be presented using terminology commonly employed by those skilled in the art to convey the substance of their work to others skilled in the art. Also, parts of the description may be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

The invention may utilize a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks, enterprise-wide computer networks, and the global Internet. In addition, it should be understood that the programs, processes, methods, etc. described herein are not related to any particular computer or apparatus nor are they related or limited to any particular communication network architecture. Rather, various types of general-purpose machines may be used with program modules constructed in accordance with the teachings described herein. Similarly, it may prove advantageous to construct a specialized apparatus to perform the method operations described herein by way of dedicated computer systems in a specific network architecture with hard-wired logic or programs stored in nonvolatile memory such as ROM (read only memory).

Various methods will be described as multiple discrete operations in turn in a manner that is most helpful in understanding embodiments of the present invention. However, the order of the description should not be construed as to imply that these operations are necessarily to be performed in any particular order, in particular, in the order of the presentation. Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing", "computing", "calculating", "determining", or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

According to an embodiment of the present invention, a method and apparatus for presenting a set of data on a graphical user interface (GUI) is provided. A GUI component, or control/widget, in a certain embodiment comprises an edit or text box area and one or more list boxes. A list may be selected and pulled down using a toggle button or other activation mechanism. Data from certain data sources may be presented in one or more lists as selectable items. According to an embodiment of the present invention, selection items are grouped into multiple lists, and the lists are presented in a certain preset order, e.g., in response to a user input. In some embodiments, lists are displayed/presented in a cyclic way, for example, when the dropdown button is pressed or a pointer is hovered over the button. In some other embodiments, a list may be explicitly selected using a certain user interface construct such as a built-in spin control or one or more buttons, or by clicking on a particular area of the widget. In some other embodiments, certain selected lists may also be presented based on the context or based on user preferences. In certain cases, lists may be filtered and only a set of selected/pre-filtered lists may be accessed by the user. Items in lists may also be filtered in certain implementations. In a certain embodiment, one or more lists may be simultaneously displayed, either overlapped or concatenated. Embodiments of the present invention may be used, among other things, to enable the user to select items from two or more mutually exclusive or hierarchically organized lists without using multiple controls.

Figure 3A:
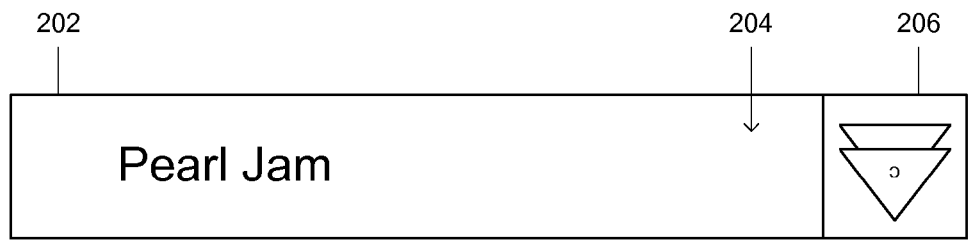
FIG. 3A illustrates a graphical user interface widget according to an embodiment of the present invention. The widget in the figure comprises a "multi-arrow" button.
Figure 3B:
FIG. 3B illustrates a graphical user interface widget according to another embodiment of the present invention. The widget comprises a "spin-control" button.
Figure 3C:
FIG. 3C illustrates a graphical user interface widget according to yet another embodiment of the present invention. The widget comprises a "cyclic" button.

With reference now to figures, FIGS. 3A-3C illustrate various exemplary graphical user interface components according to certain embodiments of the present invention. The widgets shown in these figures are displayed in their "closed" states (or, visual representations indicating the "closed" states, etc.). The exemplary widget 202 of FIG. 3A according to an embodiment of the present invention comprises a text box or edit area 204 and a button or a "multi-arrow" button 206 (e.g., to indicate that the button or the widget is associated with multiple lists, etc.). When the button 206 is pressed (or, a mouse pointer is hovered over an edit box area 204, etc.), a dropdown list is displayed. In a certain embodiment, a different list is displayed (e.g., in the same dropdown list box, etc.) when the button is pressed again. When all lists have been displayed at least once (e.g., in a certain predefined order), pressing the button one more time may close the drop-down list box. The list box may also be closed once an item is selected from one of the lists (or the hovering mouse pointer leaves the area of control, etc., depending on the implementation). The text area 204 is used to display a currently selected item. In a certain embodiment, the text box may be "editable". In such an embodiment, the selected item may be edited in the edit box 204, or a new item may be added. The newly added item may be inserted into one of the lists (e.g., stored in a data source such as a document in a file system or a table in a relational database, etc.), for example, into the "first" list in a certain preset order or into the "active" list, which is associated with the currently or previously selected item, or into the currently open list, if any, etc. When the text box 202 is non-editable, it may be used as an extension of the button 206. That is, the multi-list box may be "toggled" (e.g., cyclically) by clicking on the text box portion 204 of the widget 202, for example, using a mouse button.

FIG. 3B schematically illustrates another exemplary graphical user interface widget 212 in a closed state according to an embodiment of the present invention. The widget comprises an (editable or non-editable) edit box portion 214 and a button portion 216. The button includes a "spin-control" comprising two button 218a and 218c and a label 218b. The lists associated with the widget may be ordered in a certain predefined order, and the "active" list may be switched by pressing either the upward arrow 218a (e.g., to move to the previous list, etc.) or the downward arrow 218c (e.g., to move to the next list, etc.). The currently active list may be indicated on the label 218b (e.g., by displaying the "index" of the current list, etc.). In a certain embodiment, an additional button (e.g., in place of, or in addition to, the label 218b, etc.) may be included for opening/closing an associated dropdown list box (which may also be accomplished using other areas of the toggle button 216, including 218a and 218c, in some embodiments). It should be noted that the term "button", for example, in this context does not necessarily refer to a separate/independent control. (The same applies to edit boxes and dropdown list boxes, etc.) The graphical user interface widgets (such as various embodiments of the present invention) typically process the "mouse events", among other things, and based on the position of an event (e.g., X- and Y-coordinates of the pointer when the event occurred such as "left mouse button click", etc.) different actions are performed including redrawing a certain region such as the triangle 218a to give the visual illusion of a "button" being pressed/released in addition to performing the action associated with the "button". Other activation mechanism can also be used instead of a button (e.g., mouse hovering, etc.). In some cases, "composite" controls may be created by "assembling" simpler components (such as a button control) which are in some sense autonomous (e.g., which can handle certain events when delegated, etc.). This aspect of GUI software design should be clear to people of ordinary skill in the pertinent art. FIG. 3C illustrates another visual representation of a graphical user interface widget 222 in a closed or pulled-up state according to an embodiment of the present invention. The widget comprises a text box 224 (e.g., for displaying the currently selected item, textual or graphical, etc.) and a button 226, on which a semi-circular arrow is drawn, for example, to indicate that the multiple dropdown lists can be (cyclically, alternatingly, etc.) displayed using this button. In a certain embodiment, the rotating arrow may be drawn at a different angle depending on the current list displayed (or the active list which is associated with the currently selected item, etc.). For example, the arrowhead may be rotated to one of 0°, 90°, 180°, and 270° to indicate the currently active list out of four lists.

Figure 4A:
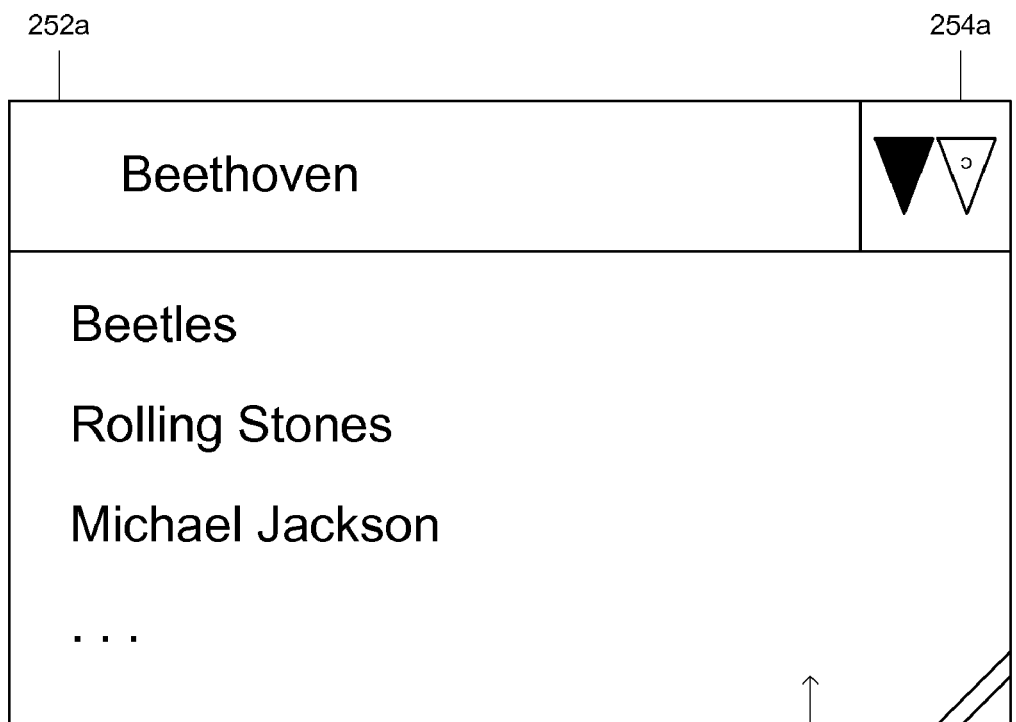
FIG. 4A shows a graphical user interface widget according to an embodiment of the present invention. The illustrated widget has one of the associated lists pulled down.
Figure 4B:
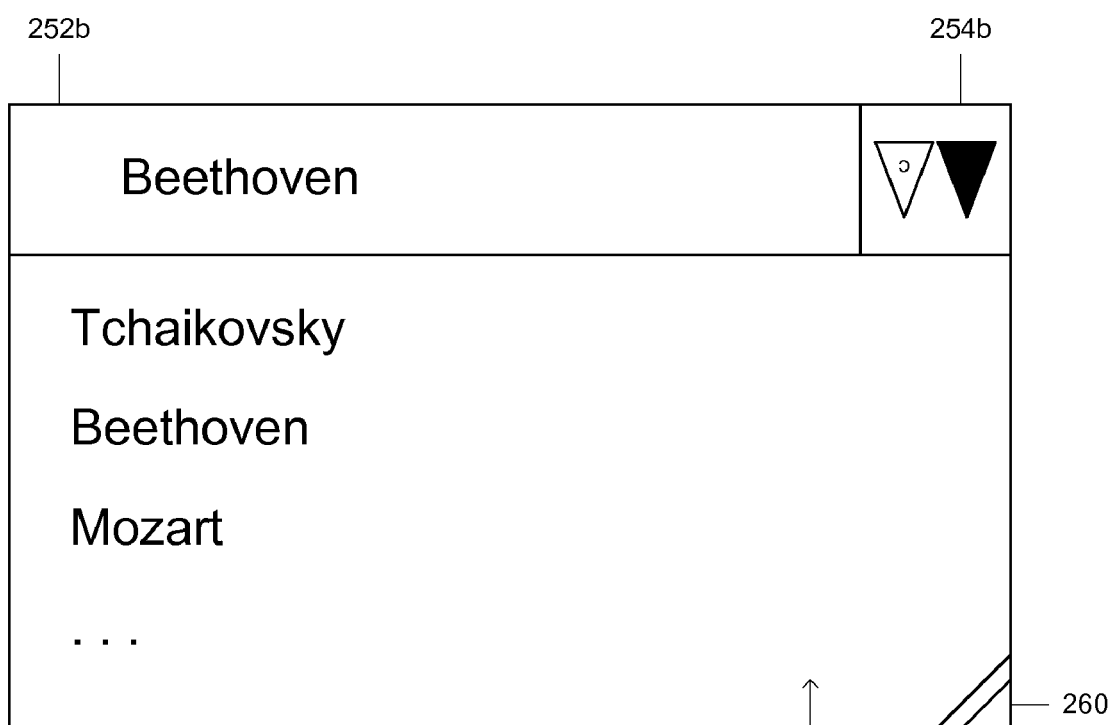
FIG. 4B shows a graphical user interface widget according to the embodiment of FIG. 4A. The widget in the figure illustrates one of the associated lists pulled down.

Turning now to FIGS. 4-6, various exemplary graphical user interface components according to certain embodiments of the present invention are illustrated. The various widgets shown in these figures are displayed in their "open" or pulled-down/dropped-down states. FIG. 4A shows a graphical user interface widget 252a according to an embodiment of the present invention. The widget shown in the figure comprises, among other things, one or more lists of items (e.g., stored in a memory of a data processing system, etc.). One of the associated lists (or, a part of it) is currently shown in a pull-down or visible state 256. The list box portion 256 of the widget can be activated (e.g., opened/pulled down, or closed/hidden, etc.) using a button 254a. FIG. 4B shows the graphical user interface widget of FIG. 4A with a different list 258 pulled down. The button 254b has a different visual representation in this example. One of the items of the associated lists (e.g., 256 or 258, etc.) may be selected and displayed in the edit box portion of the widget by the user, for example, using a pointing device or a keyboard. In the exemplary figure of FIG. 4B, the selection has not been changed even though a different list has been opened. Typically, opening a list and selecting an item involve two (or more) separate events (e.g., user actions). In some embodiments, at least one list may always be visible (open). Lists may be sorted in some way. In certain implementations, the items in an open list may also be edited or deleted. A new item may be inserted (e.g., into a particular position, etc.). In a certain embodiment, the data may be presented in a table or grid format, or as a graph or figure, etc. According to an embodiment of the present invention, different lists are displayed in the same size list box. (For example, a short list may be "padded" with blank lines, etc.) In some embodiments, each list may have a different (e.g., optimal, or user-configured, etc.) size. In a certain embodiment, a dropped-down list may be resized (e.g., its height, etc.), for example, using the "resize grip" 260. In some cases, the resizing affects the list size of all lists coupled with the widget. In some other cases, each list may be individually resized.

Figure 5A:
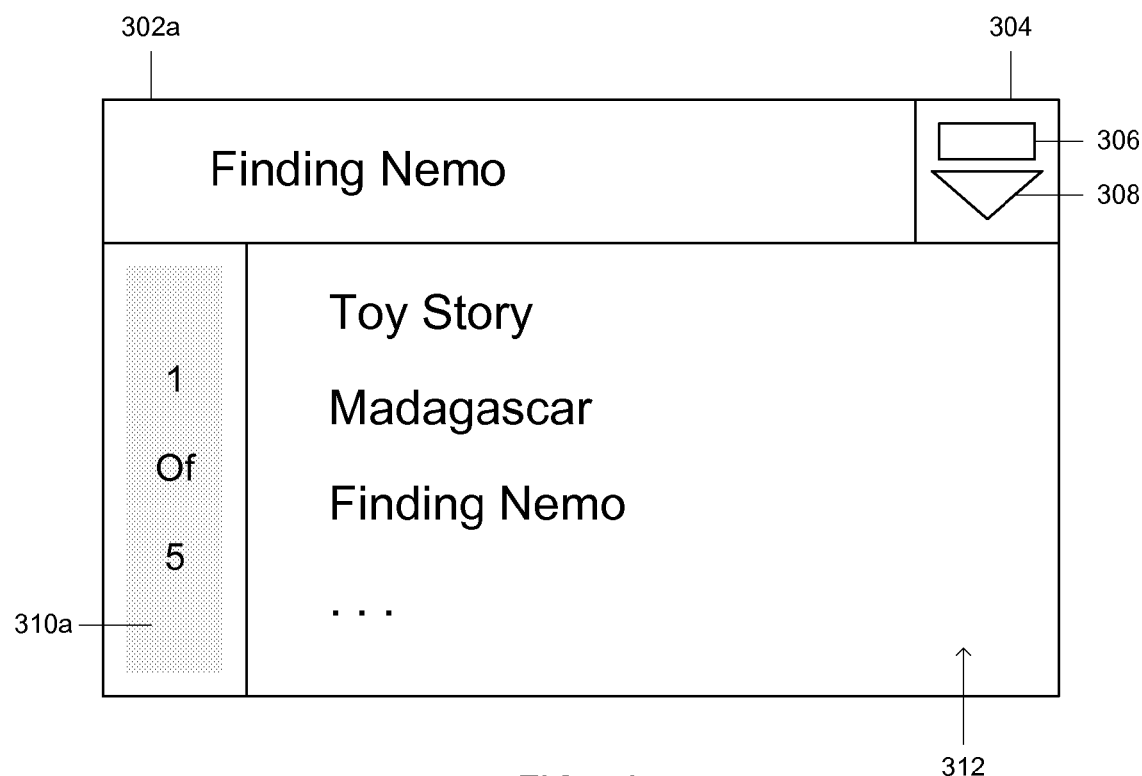
FIG. 5A illustrates a graphical user interface widget according to an embodiment of the present invention. The widget is displayed in a dropped-down state with one of the associated lists pulled down.
Figure 5B:
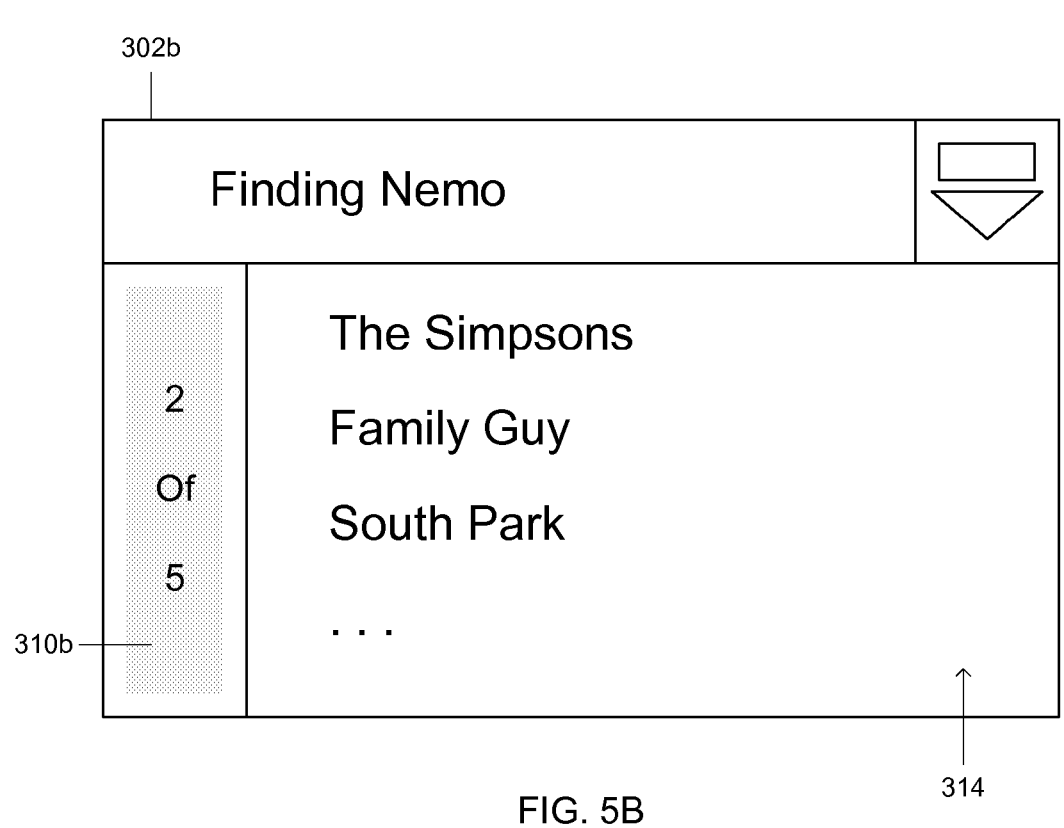
FIG. 5B illustrates a graphical user interface widget according to the embodiment of FIG. 5A. The widget is displayed in a dropped-down state with one of the associated lists pulled down.

FIG. 5A illustrates another graphical user interface component 302a according to an embodiment of the present invention. The exemplary widget is displayed in a dropped-down state with one of the associated lists 312 pulled down. The list may be pulled down/up using an activation button 304 or using other methods (e.g., using keyboard up/down arrows when the control is selected or when it has "focus", etc.). The button 304 of this exemplary widget comprises a spin-control like internal structure including an area 306, or an edit box, for inputting a "page" number (e.g., to select a list from a set of lists, etc.) and an arrow button 308 to pull down or up the selected list. The graphical representation of the arrow (e.g., upward vs. downward, etc.) may change depending on the state of the widget. The lists may also be cyclically, or otherwise alternatingly, displayed using (certain areas of) the button area 304 or the edit box area. It should be noted that even though various examples shown in this disclosure use text-based items, certain embodiments of the present invention may be used to present non-textual items such as graphical images. The list box portion of the widget 302a of FIG. 5A shows a "header" area 310a to display the page number (or, other list indicator/identifier, etc.). FIG. 5B illustrates a graphical user interface widget 302b according to the embodiment shown in FIG. 5A with a different list 314 dropped down. The list box includes a different label 310b. The page indicator may also be displayed in the box 306, or through a tooltip or balloon label, etc. In some embodiments, additional arrow buttons may be presented, for example in the area 310, so that the list can be changed (e.g., switching to the previous list, the next list, etc.) while the list area is open. By selecting one of the items in the list, the list box may be closed/hidden. In a certain embodiment, the list may also be automatically closed if there is a long pause in a user input (e.g., using a timer, etc.). According to an embodiment of the present invention, the lists are created when the widget is initialized, or configured for displaying (e.g., based on data stored in a persistent data storage, or based on certain dynamic criteria, etc.), and they may not be altered after creation. According to another embodiment, a new list (or, "page") may be inserted after the widget has been created and/or displayed, for example, being programmatically triggered by certain preset events, or in response to certain user input, etc. Existing lists may also be deleted, or they may be filtered (e.g., dynamically), or otherwise altered, in certain embodiments.

Figure 6A:
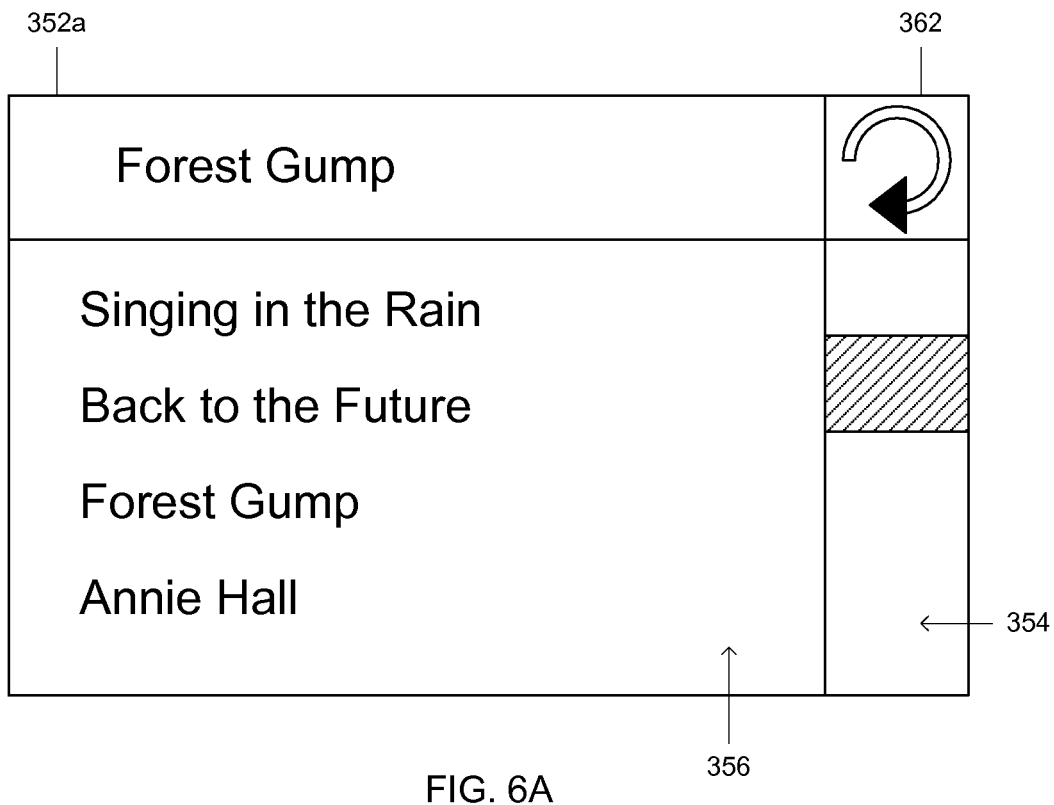
FIG. 6A illustrates a graphical user interface widget according to an embodiment of the present invention. The widget is displayed in a dropped-down state with one list activated.
Figure 6B:
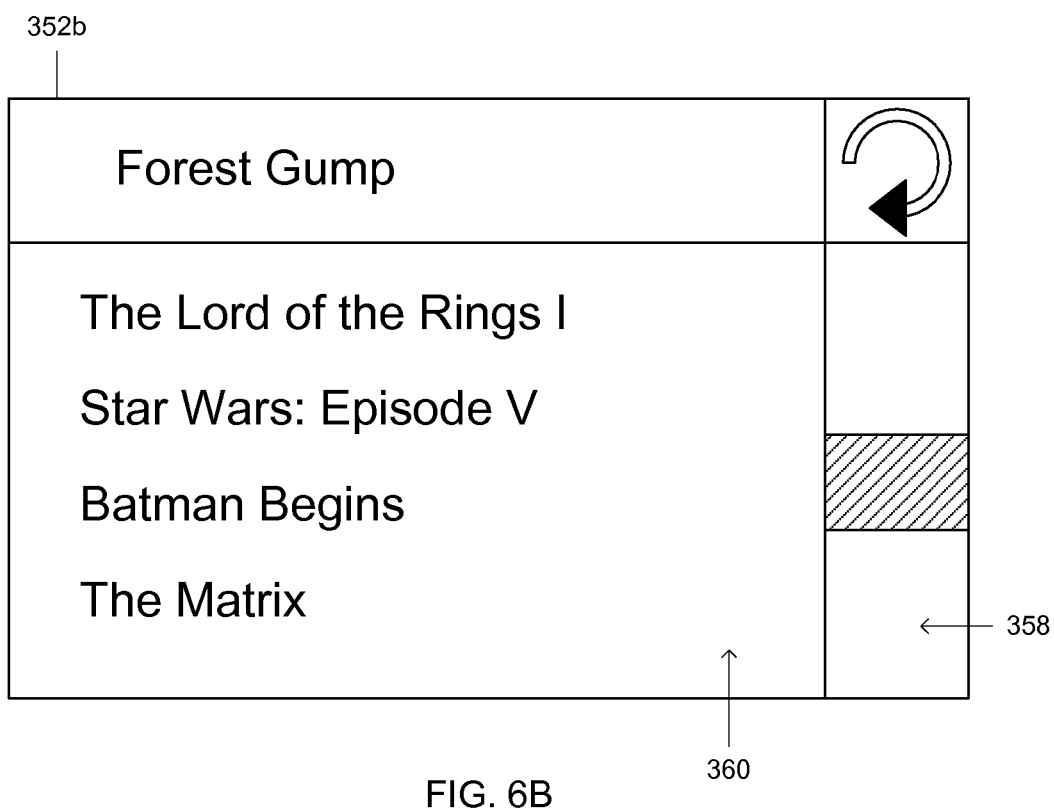
FIG. 6B illustrates a graphical user interface widget according to the embodiment of FIG. 6A. The widget is displayed in a dropped-down state with another list activated.
Figure 6C:
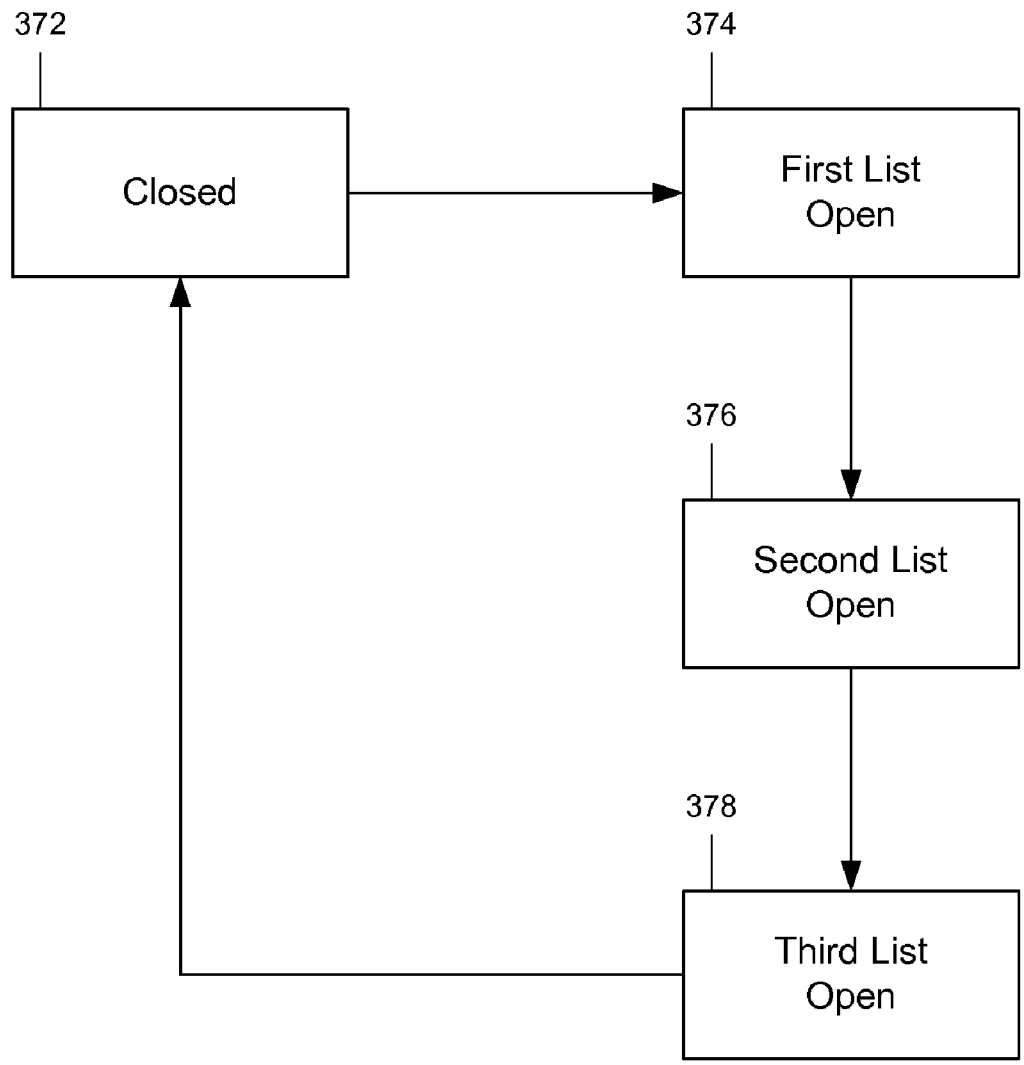
FIG. 6C illustrates a "state diagram" of an exemplary multi-list combo-box control according to an embodiment of the present invention. The diagram shows that three list boxes are associated with the exemplary control.

FIGS. 6A and 6B illustrate another graphical user interface widget 352 according to an embodiment of the present invention. The widget is displayed in a dropped-down state with one list activated. FIG. 6A shows the graphical user interface widget 352a with a list 356 activated, whereas FIG. 6B shows the graphical user interface widget 352b with another list 360 activated. In this example, a set of movies are classified into multiple lists according to their genres. The list 356 may have more items than displayed in the figure, which is indicated by a scroll bar 354. A subset of the items in the list may be scrolled and displayed using the scroll bar 354. Likewise, the list 360 is associated with a scroll bar 358. In certain implementations, the list box and the scroll bars may be internally "reused" with different content (e.g., item lists). The lists may be dynamically configured or filtered in certain cases. A current list indicator may be displayed through a means such as tooltip/balloon help. That is, when a mouse pointer is hovered over a certain region of the widget (e.g., over the button 362), information regarding the current list (e.g., "page number", etc.) may be dynamically presented to the user (e.g., in a popup window, etc.). FIG. 6C illustrates a "state diagram" of an exemplary multi-list combo-box widget according to an embodiment of the present invention. The diagram shows that three lists are associated with the exemplary widget. The widget can be in a closed state 372 (e.g., as shown in FIG. 3) or in one of the open states, 374, 376, and 378 (e.g., as shown in FIGS. 6A and 6B). According to an embodiment of the present invention, as shown in FIG. 6C, the widget's states (or representations) may be switched, for example, in the order 372, 374, 376, 378, and back to 372. As stated earlier, this may be accomplished by using a "toggle" button 362. In a certain embodiment, one of the lists predefined as the "first one" may be dropped down, at 374, when the widget is opened. In a certain other embodiment, a particular list (e.g., currently "active" one, etc.) may be displayed first. Then, other lists may be opened in a cyclic way (e.g., based on a predefined order, or based on the last time of use/display, etc.). In some embodiments, a multi-list widget may be presented to the user in open states only (e.g., without hiding the "dropdown" list area, etc.), for example, 374, 376, 378, and back to 374, etc. According to another embodiment of the present invention, the states of the widget (e.g., 352) may be alternated in the following order: 372, 374, 372, 376, 372, 378, and 372. That is, the button toggles (from open to closed, from closed to open) the dropdown list portion of the widget, and every time the widget is toggled open, it displays the "next" list (e.g., in a certain predefined order). In some embodiments, information regarding the "current" or the "next" list may be visually presented, for example, in the button area 362 of FIGS. 6A and 6B. In some cases, the list traversal order may be reversed, for example, moving to the "previous" list, etc. (e.g., using a different button, etc.). In a certain embodiment of the present invention, "toggling" (between different states, between different lists, etc.) may be triggered through mouse events and/or keyboard events. In some cases, "keyboard shortcuts" may be used, for example, to open a particular list, etc.

Figure 7:
FIG. 7 illustrates an "anatomy" of an exemplary graphical user interface widget according to an embodiment of the present invention. The exemplary widget includes an edit box, a button, and one or more list boxes.

Referring now to FIG. 7, various "components" of an exemplary multi-list dropdown component according to an embodiment of the present invention are illustrated in a schematic block diagram form. The exemplary widget includes an (editable or non-editable) edit box 402 for displaying a selected item (text or image, etc.), a button 404 for toggling drop down lists, and one or more list boxes, 406 and 408 in the figure. As stated earlier, these components represent abstraction of functional entities (e.g., not necessarily separate controls by themselves). In a certain embodiment, the button part 404 may be optional. In a certain other embodiment, more than one button may be used. The items in the lists may be dynamically generated (or, filtered based on predefined lists, etc.) or they may come from separate (static) data sources. In some cases, a list may be dynamically "paginated" into multiple lists (e.g., based on a pre-configured value, such as the maximum number of items in a single list/page, etc.). In a certain embodiment of the present invention, a single dropdown list box component (e.g., a visual abstraction) is used/reused for multiple data sources (or, lists). In a certain other embodiment, a list box component may be built in memory for each data source. In some cases, the lists (of the appropriate data) are simply drawn/painted (e.g., in response to events such OnPaint, OnInvalidate, etc.). The lists (or, list boxes) may be resizable (e.g., new items may be added, exiting items may be deleted, etc.) or otherwise alterable in some implementations. New lists may also be added or existing lists may be removed from the widget in certain cases. According to an embodiment of the present invention, items (e.g., stored in one data source, etc.) may have attributes (or, tags, classes, categories, etc.) associated with them, and a set of lists may be created (e.g., either at the time of application startup or at the time of widget creation/initialization/configuration, etc.) based on the items' attributes. For example, one list 406 may contain items with the last modified date in the year 2004, and another list 408 may contain items with the last modified date in the year 2005, etc. According to an embodiment of the present invention, a graphical user interface widget is (visually) constructed from these elements or building blocks 402, 404, 406, and 408.

Figure 8:
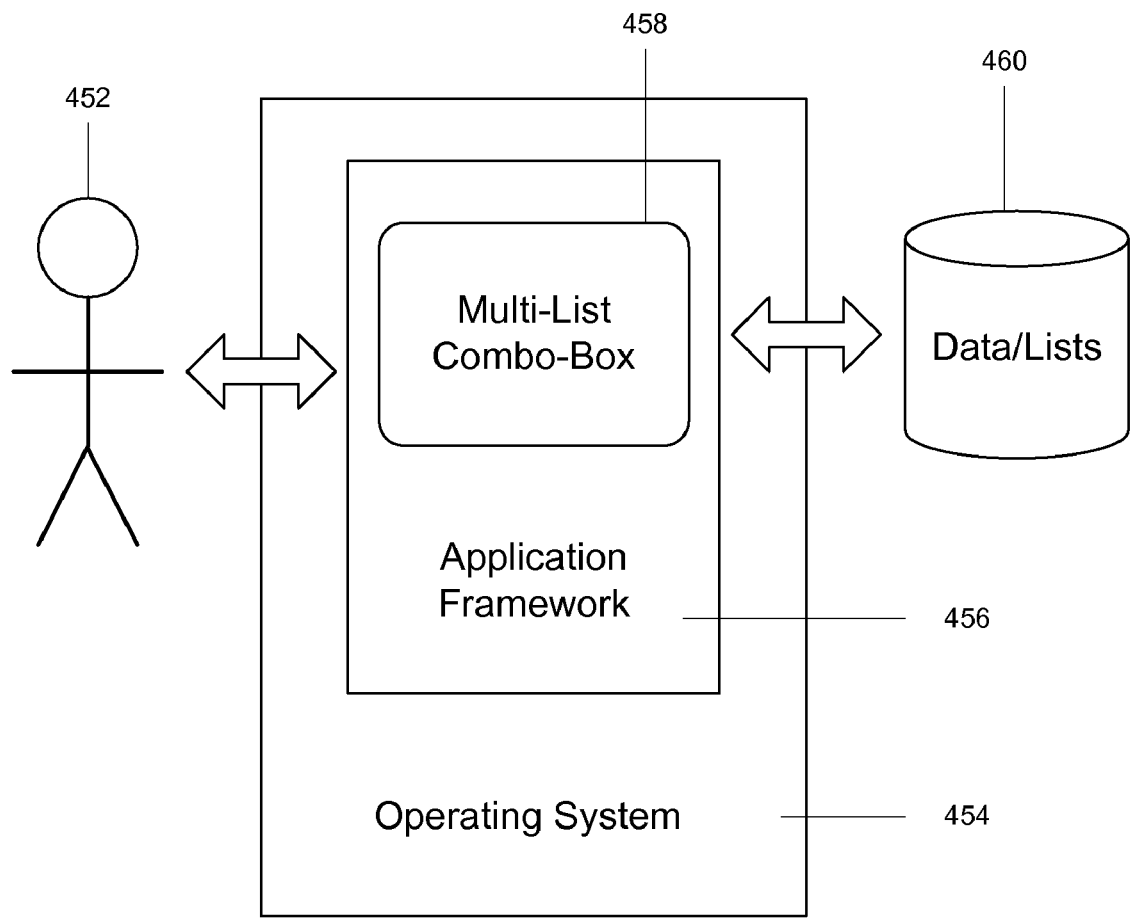
FIG. 8 shows a list of certain software modules or components in a schematic block diagram form according to an embodiment of the present invention.

In a typical implementation, GUI widgets are part of an operating system (or a virtual machine) or an application framework, or they are provided as part of a (GUI) library (either statically or dynamically linked, etc.). This is schematically illustrated in FIG. 8, which shows relevant software modules or components in a block diagram form according to an embodiment of the present invention. According to this exemplary diagram, the user 452 interacts with the system shown on the right-hand side of the figure. The exemplary system comprises an operating system 454 and an application framework 456. In this illustration, the GUI widget 458 is included in the application framework 456. The user typically interacts with an application (not shown in the figure), which may be built within (or, on top of) the application framework 456 and configured to run on a particular operating system 454 (or, a virtual machine, etc). The application may implement its own multi-list combo-box controls according to a certain embodiment of the present invention, or it may utilize pre-implemented widgets, for example, provided in the application framework 456. In this diagram, the relevant data (items in one or more lists, the selected item, other visual configuration, etc.) is stored in a persistent data source 460. The list data may be dynamically built in memory (e.g., based on a certain preset algorithm and/or using other input data, etc.). In some cases, the data source (or, content of the widget) may be associated with a particular application.

Figure 9:
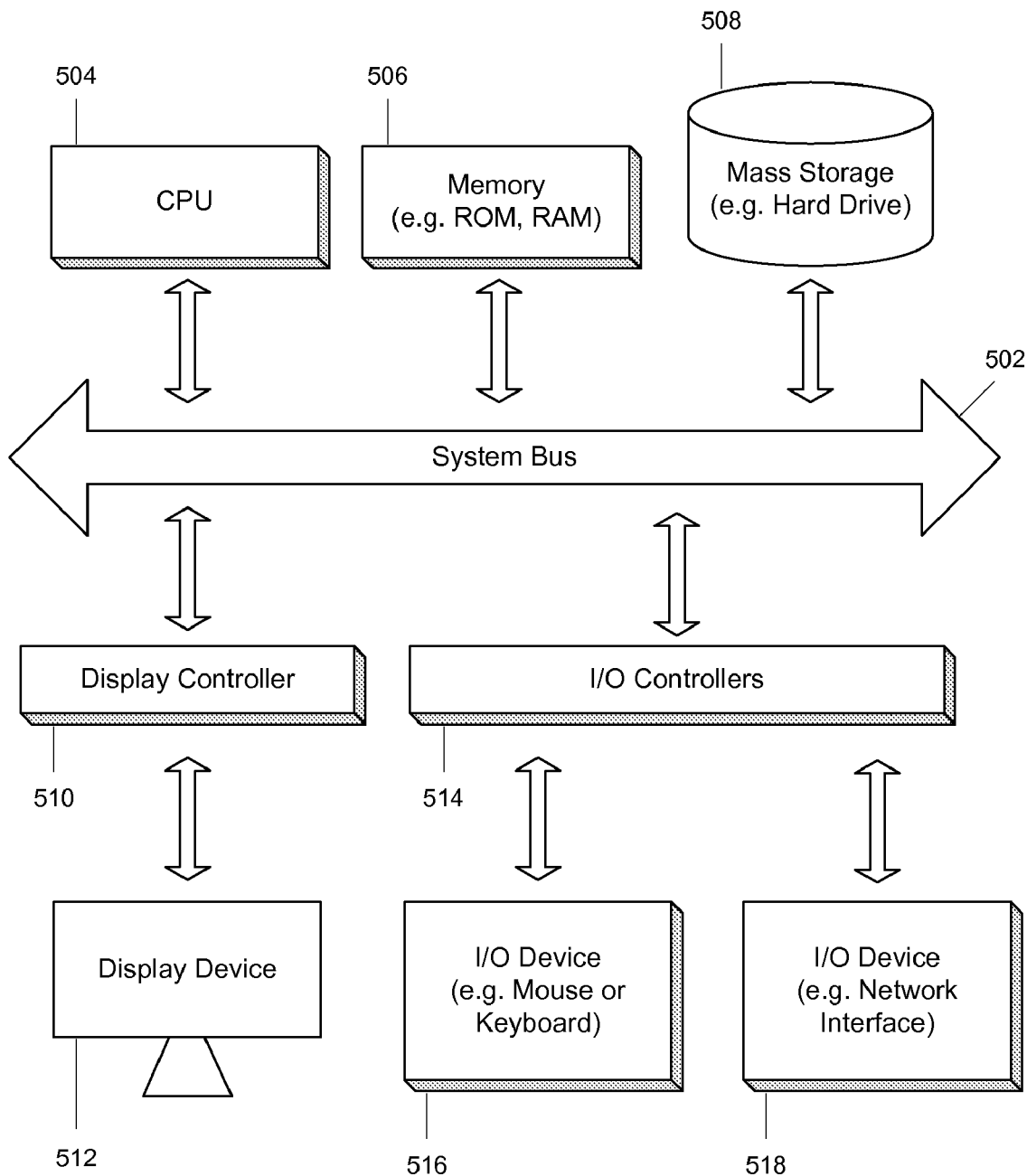
FIG. 9 illustrates an "architecture" of an exemplary data processing system, with which some embodiments of the present invention can be practiced.

FIG. 9 illustrates various elements of an exemplary data processing system such as a personal computer, with which some embodiments of the present invention can be practiced. This and other data processing systems may be used with various embodiments of the present invention. As will be appreciated by one of skill in the art, however, the present invention may be embodied as a method, data processing system or program product as well as an article of manufacture or an apparatus. Thus the scope of the invention should be determined by the appended claims and their legal equivalents, and not by the examples given. Note that while the block diagram of FIG. 9 illustrates various components of a data processing system, it is not intended to represent any particular architecture or manner of interconnecting the components. It will also be appreciated that personal computers, laptops, and network computers, and other data processing systems such as cellular telephones, personal digital assistants (PDAs), digital media players, etc. which have fewer components or perhaps more components may also be used with the present invention.

As shown in FIG. 9, the exemplary data processing system includes at least one bus 502 which is coupled to a microprocessor(s) 504 and a memory 506 such as a ROM (read only memory) or a volatile RAM (random access memory) and a non-volatile storage device(s) 508. The system bus 502 interconnects these various components together and also interconnects these components 504, 506, and 508 to a display controller(s) 510 and a display device(s) 512 such as LCD (liquid crystal display) screens and to peripheral devices such as input/output (I/O) devices 516 and 518 which may be mice, keyboards, input wheels, modems, network interfaces, printers and other devices which are well known in the art. Typically, the I/O devices 516 and 518 are coupled to the system through I/O controllers 514. The volatile RAM 516 is typically implemented as dynamic RAM (DRAM) which requires power continually in order to refresh or maintain the data in the memory. The mass storage 508 is typically a magnetic hard drive or a magnetic optical drive or an optical drive or a DVD ROM or other types of memory systems which maintain data (e.g. large amounts of data) even after power is removed from the system. Typically, the mass storage 508 will also be a random access memory although this is not required. While FIG. 9 shows that the mass storage 508 is a local device coupled directly to the rest of the components in the data processing system, it will be appreciated that the present invention may utilize a non-volatile memory which is remote from the system, such as a network storage device which is coupled to the data processing system through a network interface 518 such as a modem or Ethernet interface. The bus 502 may include one or more buses connected to each other through various bridges, controllers and/or adapters as is well known in the art. In one embodiment, the I/O controller 514 includes a USB (universal serial bus) adapter for controlling USB peripherals and an IEEE 1394 ("firewire") controller for IEEE 1394 compliant peripherals. The display controllers 510 may include additional processors such as GPUs (graphical processing units) and they may control one or more display devices 512.

Figure 10A:
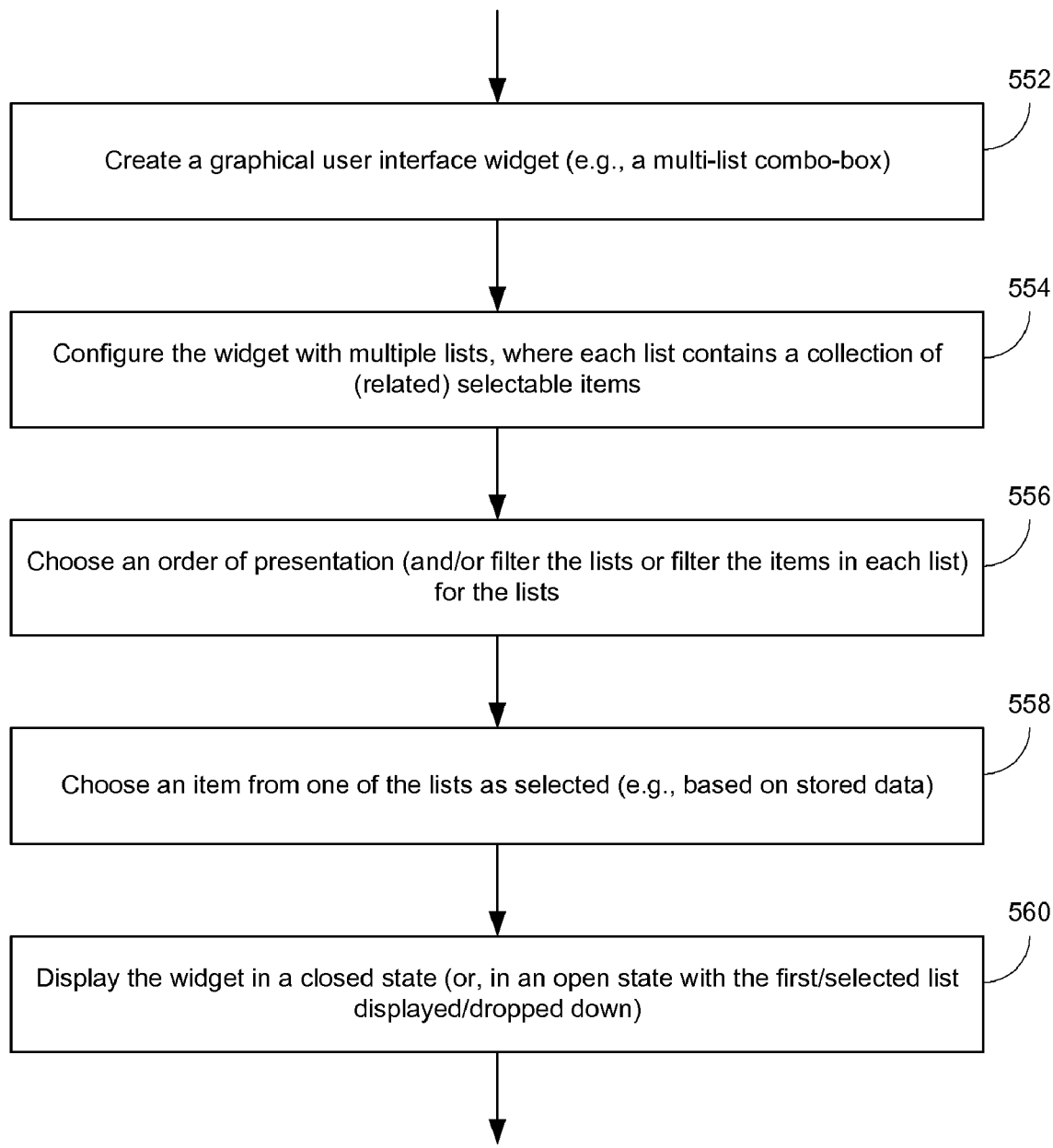
FIG. 10A shows a flow chart illustrating certain exemplary operations of an embodiment of the present invention. The flow chart illustrates, among other things, operations for displaying a multi-list combo-box widget on a graphical user interface.

With reference now to FIG. 10, flow charts illustrating various exemplary operations of certain embodiments of the present invention are shown. FIG. 10A shows a flow chart according to an embodiment of the present invention. The exemplary process of the flow chart illustrates, among other things, operations for displaying a multi-list combo-box widget on a graphical user interface. The process begins, at block 552, by first instantiating a graphical user interface widget (e.g., a multi-list combo-box). The lists (or the data) of the widget are then configured at 554, for example, by listing a collection of (related) selectable items in each list. The lists may be further filtered or otherwise modified/processed, and the order of presentation is determined, as indicated in block 556. One of the items from the lists is selected (e.g., based on stored data), at 558, for display purposes (e.g., to be displayed as a selected item in the edit box area of the widget). The data may be retrieved from user-specific data source (e.g., in a "registry" file on Windows platform, in a relational database, or in an application configuration file, etc.). In a certain embodiment, the newly created widget is displayed in its closed state, at 560. In a certain other embodiment, the widget may be displayed in an open state with the first/selected list displayed/dropped down, etc.

Figure 10B:
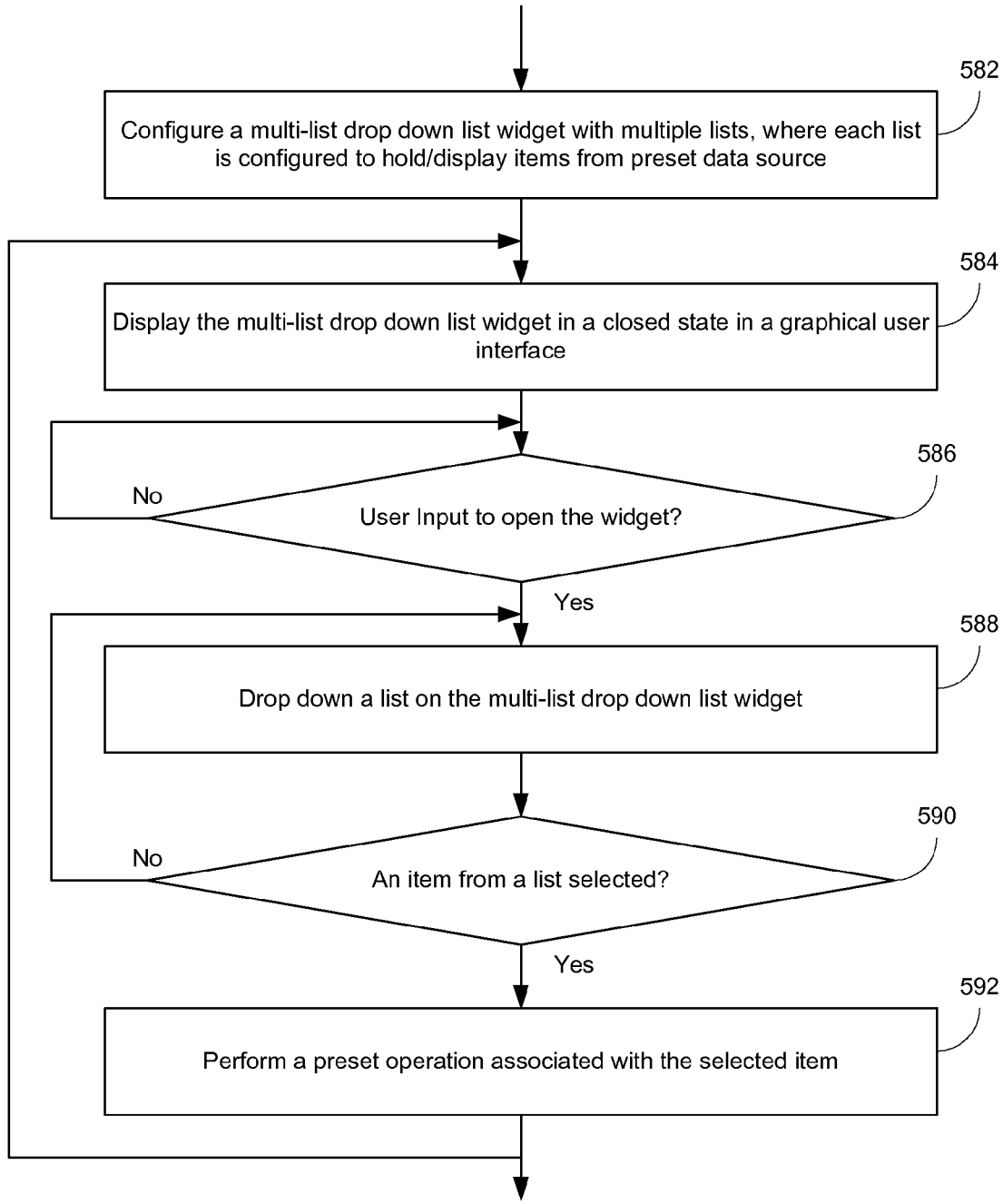
FIG. 10B shows a flow chart illustrating certain exemplary operations of an embodiment of the present invention. The flow chart illustrates, among other things, operations for handling events or user inputs on a graphical user interface.

FIG. 10B shows another flow chart illustrating certain exemplary operations of an embodiment of the present invention. The exemplary process of the flow chart illustrates, among other things, operations for handling events or user inputs on a graphical user interface. At blocks 582 and 584, a multi-list drop down list widget with multiple lists is initialized, where each list is configured to hold/display items from certain preset data source, and it is displayed in a closed state in a graphical user interface. When a user input to open the widget is received, at 586, a list on the multi-list drop down list widget is opened, at 588. The list may be selected based on a predefined order, or it may be selected randomly. In some cases, the last viewed list (e.g., by the current user) may be opened. The user may also be able to select a particular list in some embodiments (e.g., by clicking on a particular part of the widget, etc.). The list may be closed, or different list may be opened (e.g., in a cyclic fashion). If an item from the currently open list is selected, at 590, a preset operation(s) associated with the selected item is performed, at indicated in block 592 (as well as the selected item being displayed in the text box area, etc.). The list may also be closed in response to the selection. Or, a different list may be opened in a certain embodiment after an item is selected from one list, which allows the user to select multiple items (e.g., one from each list, etc.) from a single widget. If no selection is made at 590 and a different list is opened following the loop, 588 and 590, an item from the newly displayed list may be selected, at 592, by the user, or another list may be opened. The list can also be closed without making selection (e.g., thereby keeping the current selection, etc.).

Figure 10C:
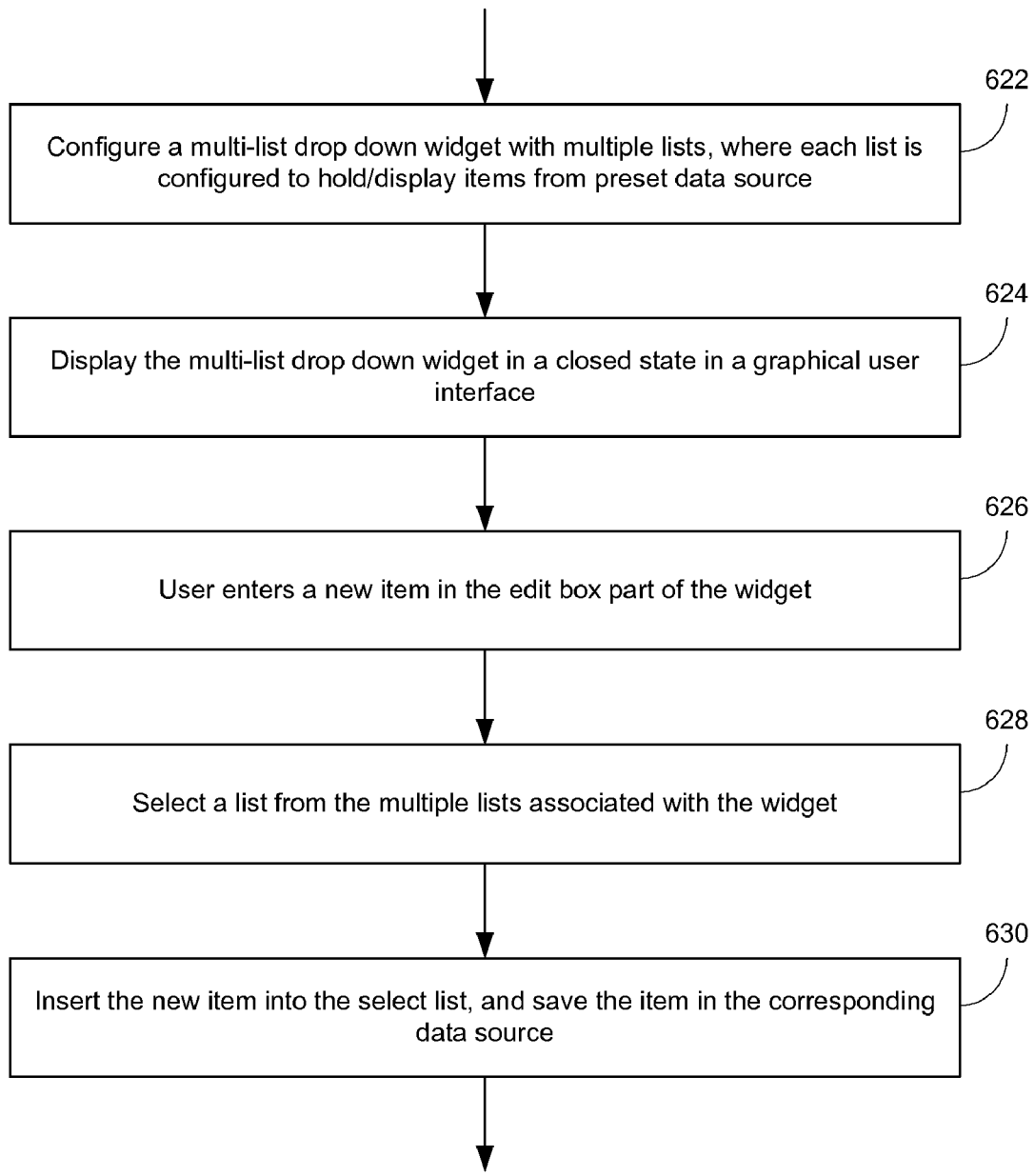
FIG. 10C shows a flow chart illustrating certain exemplary operations of an embodiment of the present invention. The flow chart illustrates, among other things, operations for adding a new item into one of the lists associated with a GUI widget.
Figure 11A:
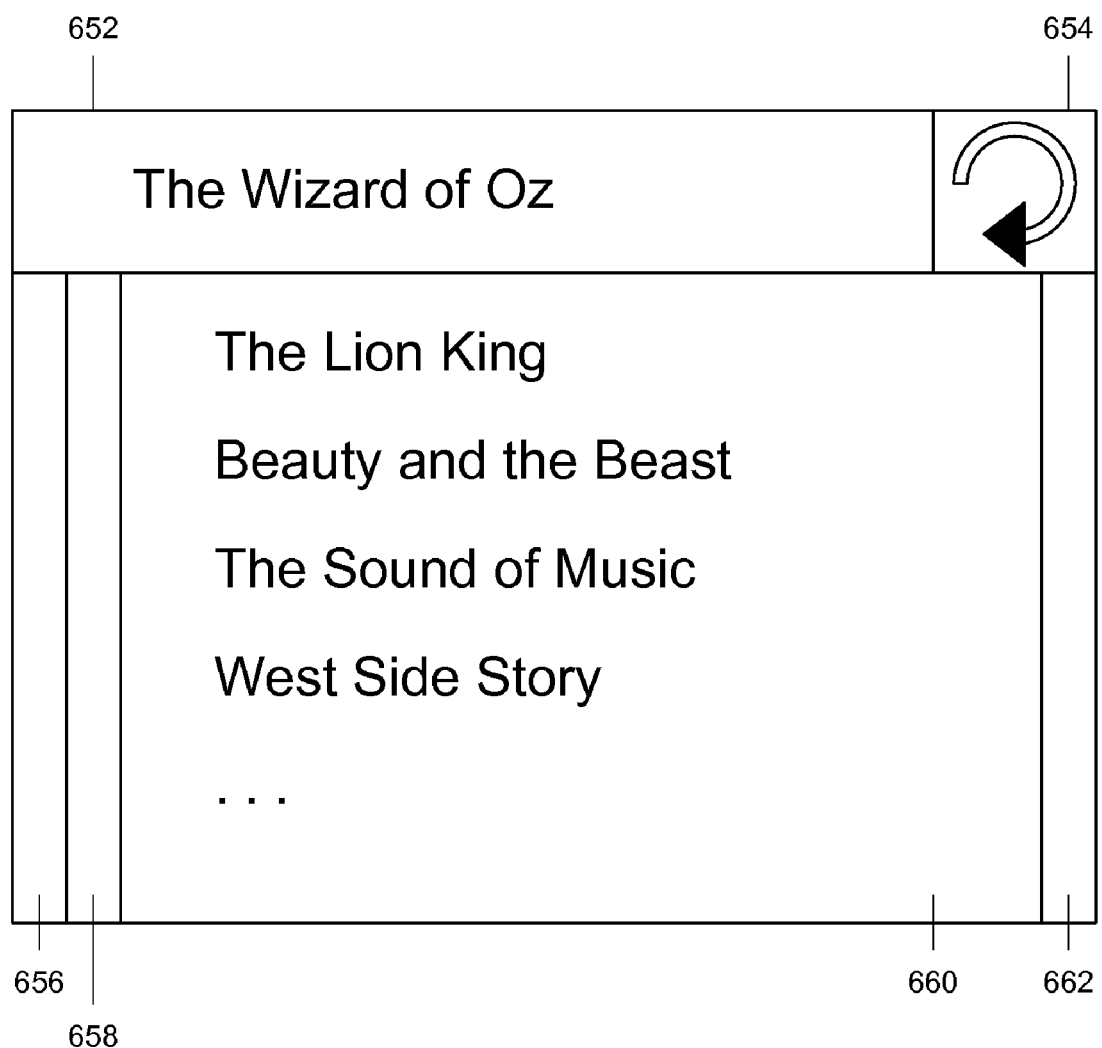
FIG. 11A illustrates an embodiment of the present invention. In the open state of the widget shown in the figure, multiple lists are simultaneously displayed (e.g., overlapped to one another).
Figure 11B:
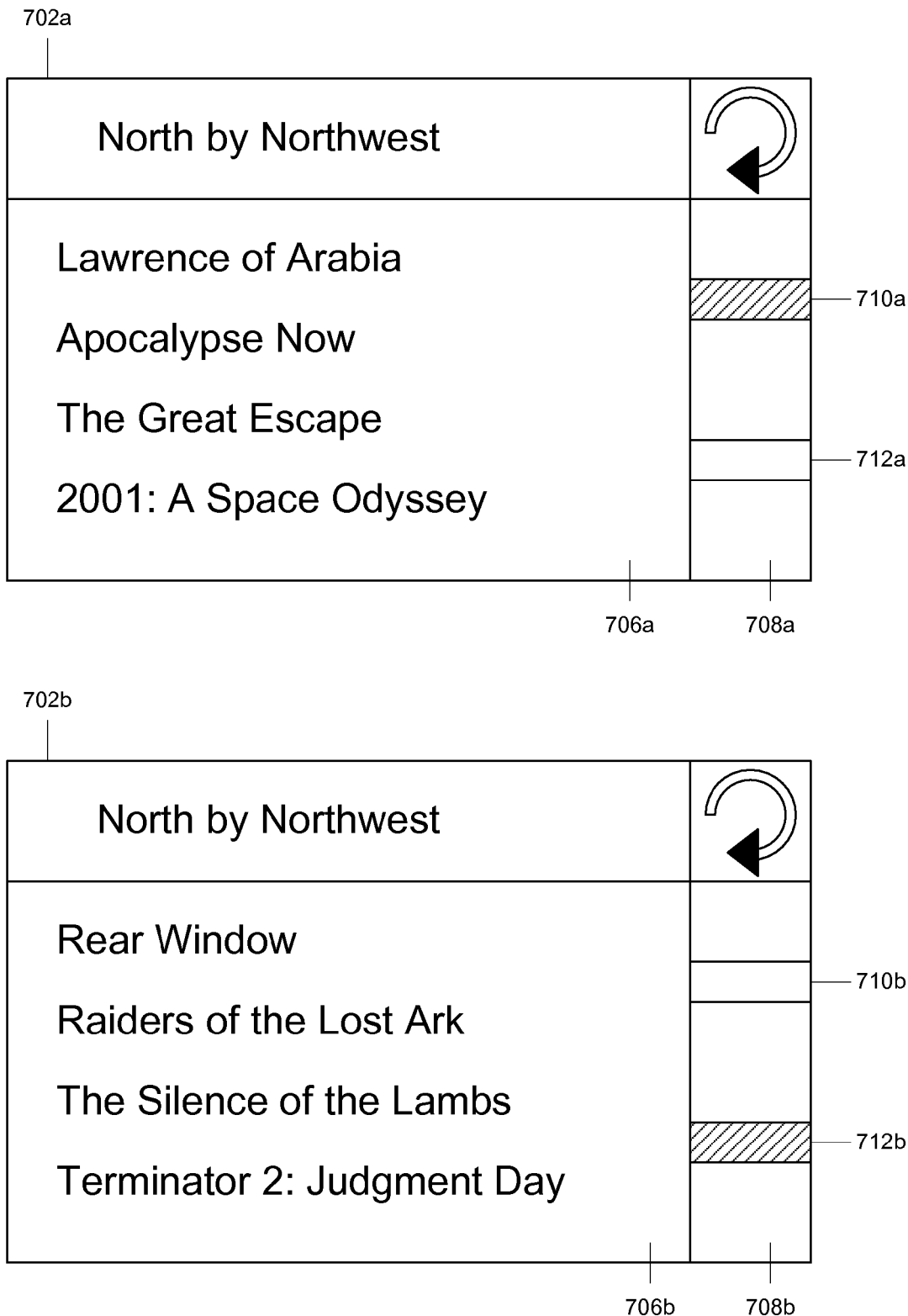
FIG. 11B illustrates an embodiment of the present invention. In the top and bottom figures, two different states of an exemplary widget are shown.
Figure 11C:
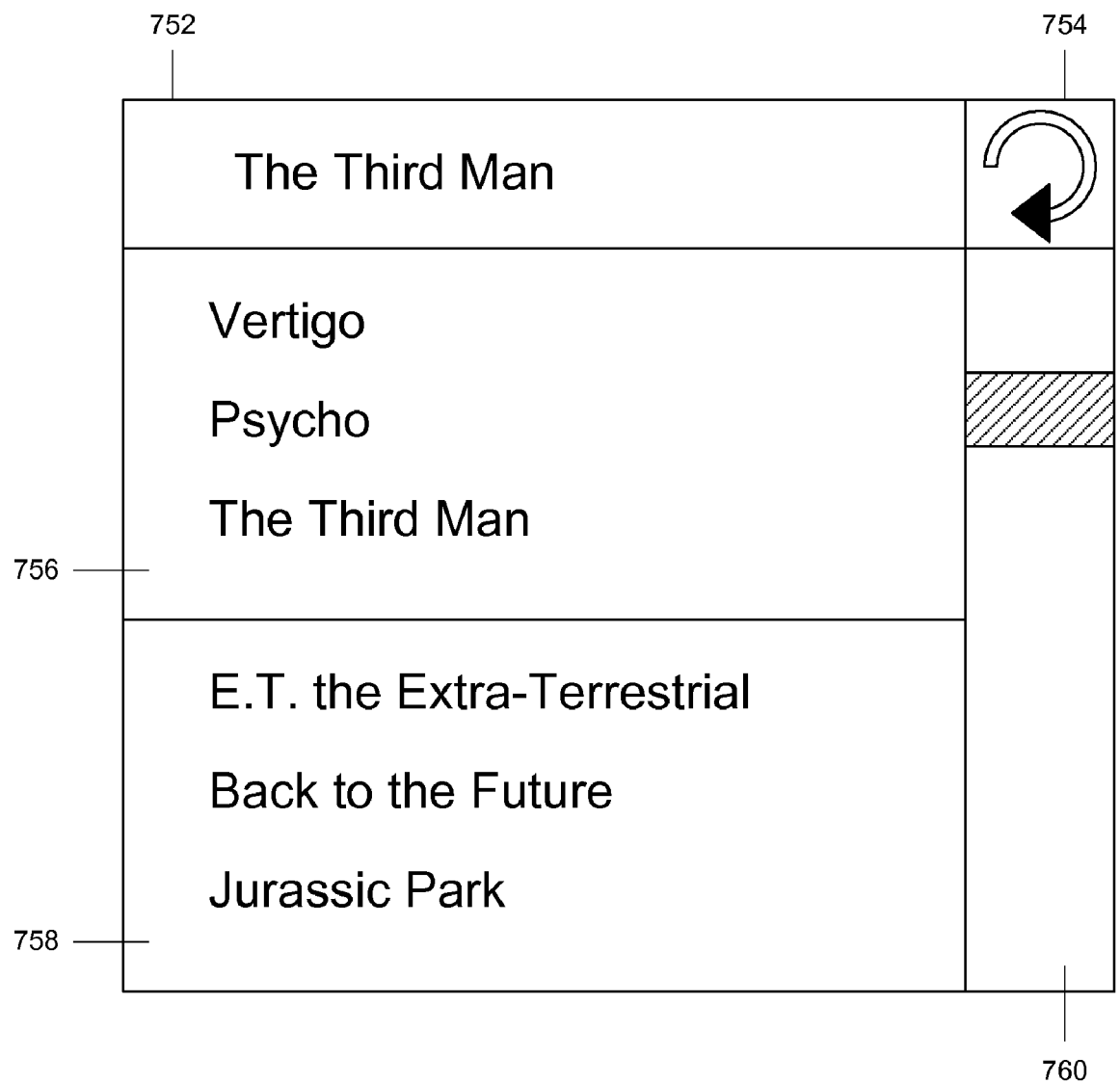
FIG. 11C illustrates an embodiment of the present invention. In the open state of the widget shown in the figure, multiple lists are displayed at the same time (e.g., as a single "super-list").

FIG. 10C shows another flow chart illustrating certain exemplary operations of an embodiment of the present invention. The flow chart illustrates, among other things, operations for adding a new item into one of the lists associated with a graphical user interface component. The exemplary process begins at blocks 622 and 624 by configuring a multi-list drop down list widget with multiple lists, where each list is configured to hold/display items from preset data source (e.g., each list from the same or different data source, etc.), and by displaying it in a closed state in a graphical user interface. When a user enters a new item in the edit box part of the widget, at 626, a particular list from the multiple lists associated with the widget is selected first (e.g., based on a certain preset algorithm, for example, by selecting the most recently viewed/modified list, etc.), at 628. Then, the new item is inserted into the selected list, at 630. In a certain embodiment, the item may subsequently be stored in the corresponding data source (e.g., in a persistent data storage, etc.). According to an embodiment of the present invention, the new item is inserted into the list associated with the currently (or, previously) selected item. In a certain embodiment, there may be a default list to which new items may be added. In some cases, the user may be explicitly prompted (e.g., through a dialog window, etc.) as to which list the new item is to be inserted (for example, in terms of Genre of a movie title when the lists are classified based on the movie's genres, etc.).

Turning now to FIGS. 11-16, various exemplary embodiments of the present invention are illustrated. FIG. 11A shows a GUI widget, a multi-list (dropdown) list box, according to an embodiment of the present invention. The exemplary widget 652 is shown in its open state in the figure, with multiple lists 656, 658, 660, 662 simultaneously displayed (e.g., overlapped to one another). In the figure, the third list 660 is shown on top of the other lists. The user may be able to cycle through the lists by clicking on a button 654 with a pointer (possibly, including the closed state). In a certain embodiment, a list may be explicitly selected by clicking on the displayed region of the list (e.g., a narrow slab like region in the figure, etc.). In some embodiments, a tab control is used to present multiple lists in a dropdown list box portion of the widget. In some other embodiments, more than one list may be displayed at one time (e.g., one above the edit-box area and another below it, etc.). The lists may then be cyclically rotated through these two or more "list areas", for instance. FIG. 11B illustrates another visual representation of an exemplary multi-list widget, 702a and 702b, according to an embodiment of the present invention. In the top and bottom figures, two different lists are displayed, 706a and 706b. The exemplary widget uses a "multi-scroll bar", 708a and 708b, that is, a scrolling control with multiple thumbs or scroll boxes, 710a/710b and 712a/712b. In top illustration, the top thumb 710a is selected and the corresponding list 706a is "activated", in the bottom illustration, the bottom thumb 712b is selected and the corresponding list 706b is displayed. The thumbs may also be used to scroll through items in the selected list. According to an embodiment of the present invention, two or more lists may be combined (e.g., dynamically) and items from these lists may be presented at the same time. This is illustrated in FIG. 11C, where an exemplary multi-list combo-box 752 is shown according to an embodiment of the present invention. The exemplary widget comprises a button 754 for displaying/hiding the list portion and/or for alternating among different lists. The widget is shown in an open state in the figure with multiple lists displayed at the same time. The illustration shows at least two lists, 756 and 758, virtually concatenated into one. In some implementations, concatenation may be toggled (e.g., between displaying one list and displaying more than one list at the same time). The widget 752 also includes a scroll bar 760 for scrolling items, or for displaying a portion of the lists. In a certain embodiment, items from one or more lists may be grouped into a "page" (e.g., comprising multiple lists), and each page may be displayed in the list area when activated, for example, by the button 754. In some embodiments, all lists may be combined into one and displayed, e.g., in response to a user input (for example, as one of the multiple "states", etc.).

Figure 12:
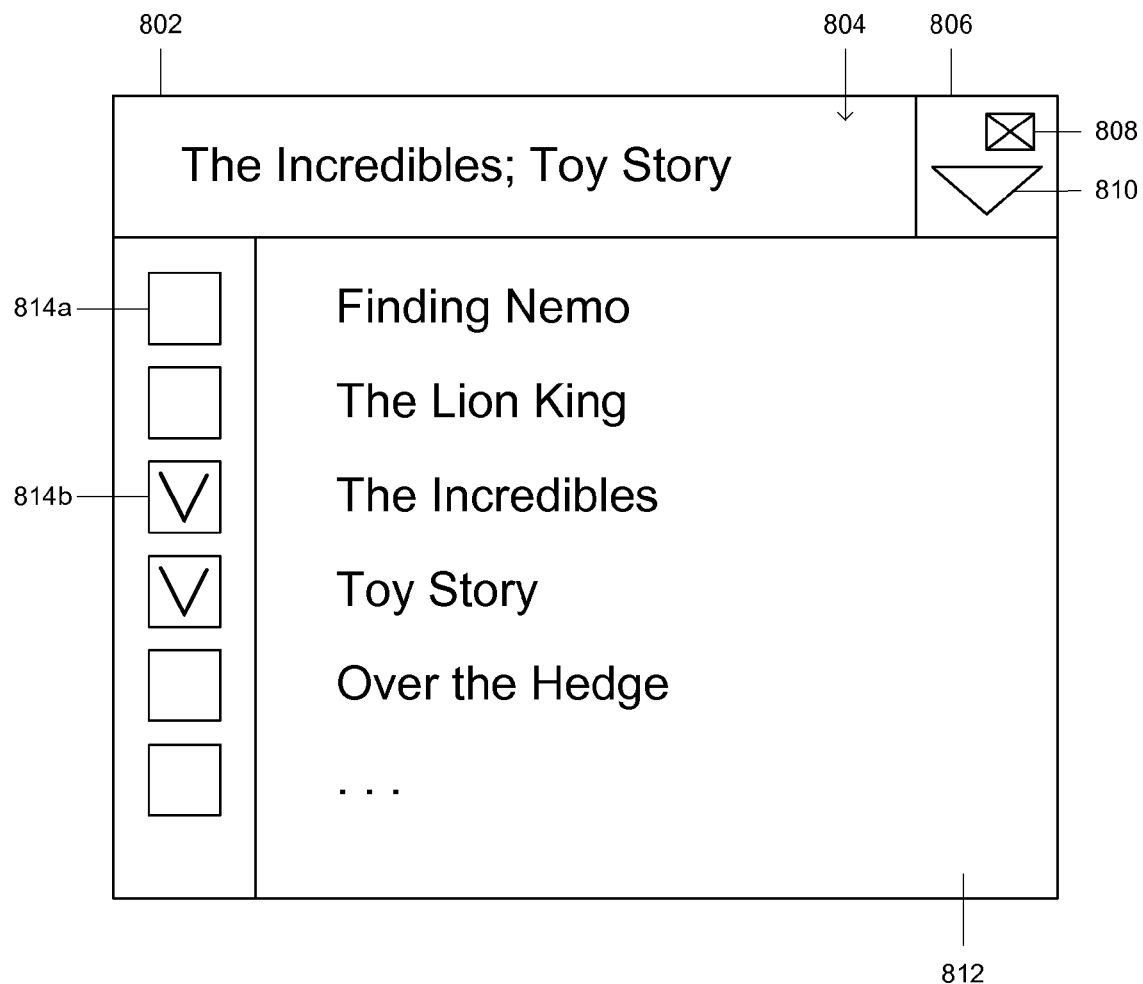
FIG. 12 shows a graphical user interface widget according to an embodiment of the present invention. In this embodiment, multiple items may be selected.

FIG. 12 shows another design of a graphical user interface widget 802 according to an embodiment of the present invention. The exemplary widget comprises an area 804 for displaying selected items and a "button" area 806 for showing/hiding and/or alternating lists. The area 806 comprises a "drop down" button 810, and it further comprises an explicit button 808 for closing/hiding any open list(s). The exemplary multi-list widget 802 also comprises a list area 812. In this embodiment illustrated in the figure, multiple items may be selected, as indicated by checkbox UI 814. The items may be selected (e.g., as indicated by checked checkboxes 814*b*) or unselected (e.g., as indicated by unchecked checkboxes 814*a*). In this particular example, two items are selected (e.g., "The Incredibles" and "Toy Story") and they are displayed in the edit box area 804. According to an embodiment of the present invention, multiple items may be "selected". According to another embodiment, at most one item from each list may be selected. According to yet another embodiment, a number of items less than a certain preset value may be simultaneously selected. In some cases, all selected items may be simultaneously displayed in the edit box area 804 (e.g., in multiple rows, etc.). In some other cases, only a subset of the selected items may be displayed (e.g., selected items from a particular list, etc.).

Figure 13:
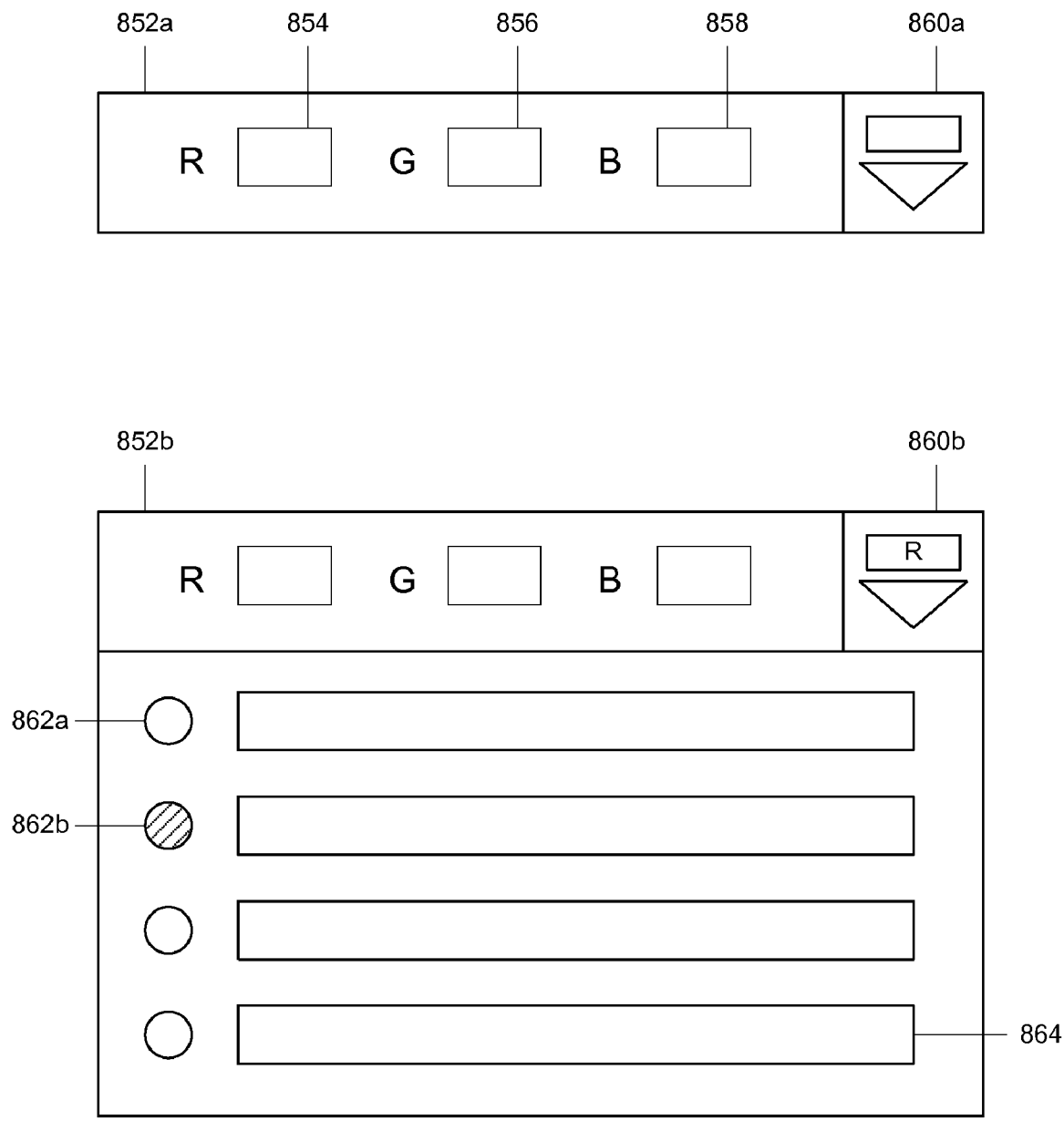
FIG. 13 illustrates an exemplary graphical user interface widget according to an embodiment of the present invention. The top figure shows a closed state of the exemplary widget, whereas the bottom figure shows the widget in an open state.

FIG. 13 illustrates another exemplary graphical user interface component 852 according to an embodiment of the present invention. The top figure shows a closed state of the exemplary widget 852*a*, whereas the bottom figure shows the widget 852*b* in one of the (three) open states. In this example, the widget's "edit box" region includes three segments, 854, 856, and 858 for displaying selected R, G, and B color components, respectively. By using the button 860*a*, different levels for each color component may be selected (for example, 8 bit value from 0 to 255, etc.). In the bottom figure, the red color component is selected, as indicated by the letter "R" in the button 860*b*. The items 864 in the dropdown list area represent different levels or shades of the red color. A particular value (e.g., a numeric value between 0 and 255, or one of preset colors as shown in the figure, etc.) may be selected using a radio button UI 862. In the figure, the second item is selected as indicated by checked radio button 862*b*. The radio button UI is typically used to select one out of multiple choices (the rest of the unchecked radio buttons 862*a* have different visual look, etc.). By using the button, 860, color levels of G and B colors may also be selected. In a certain embodiment, a particular color selection list or palette may be directly opened/closed, for example, by clicking on a corresponding region, e.g., 854, 856, or 858.

Figure 14:
FIG. 14 illustrates an exemplary graphical user interface window for setting user preferences according to an embodiment of the present invention. This particular setting may be used for configuring a multi-list combo-box widget in a certain context.
Figure 14:
Figure 14:
Figure 14:
Figure 14:

In some embodiments of the present invention, lists or items may be "filtered" based on various criteria. One example is illustrated in FIG. 14, which shows an exemplary graphical user interface window 902 for setting user preferences according to an embodiment of the present invention. This particular setting may be used for configuring a multi-list combo-box widget in a certain context. For example, when a user is given a choice for selecting a certain movie, the lists may be limited to selected genres in this UI window. According to a certain embodiment, the preference setting UI (e.g., for filtering) may be presented along with a multi-list widget. For example, an additional button may be associated with the widget, which can activate a setup window similar to the one shown in FIG. 14. In some cases, each list may be configured to show/not show from its list box area, for example, using a "Do Not Show" checkbox, etc.

Figure 15A:
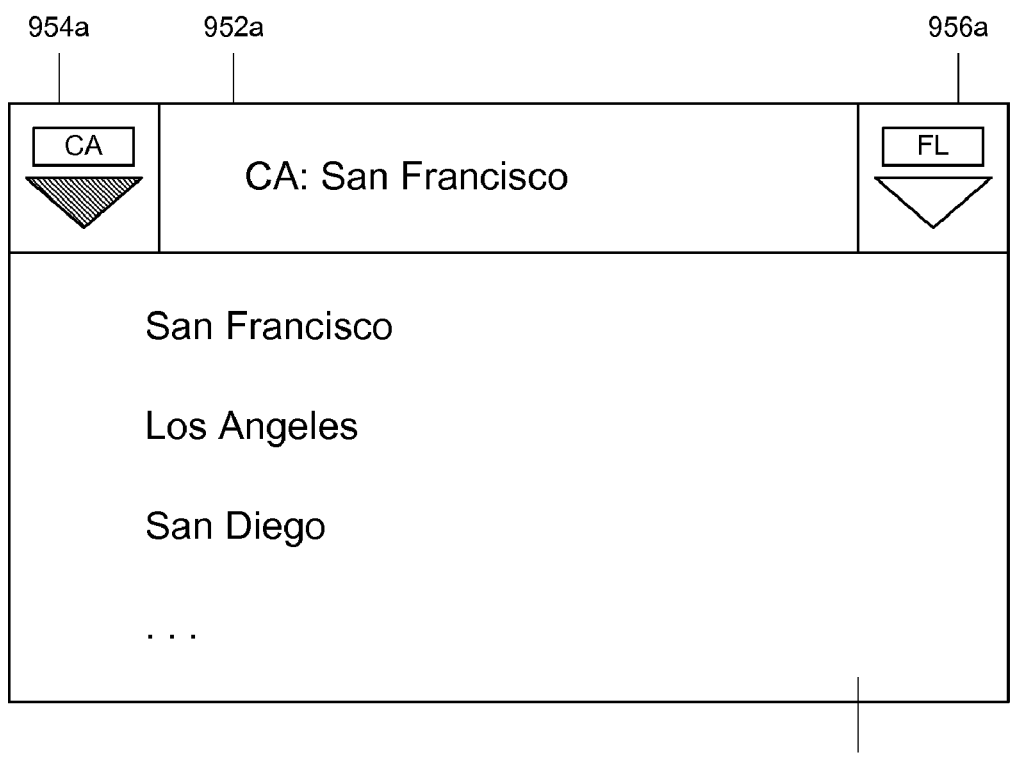
FIG. 15A illustrates an exemplary graphical user interface control according to an embodiment of the present invention. One drop-down list is shown in the figure.
Figure 15B:
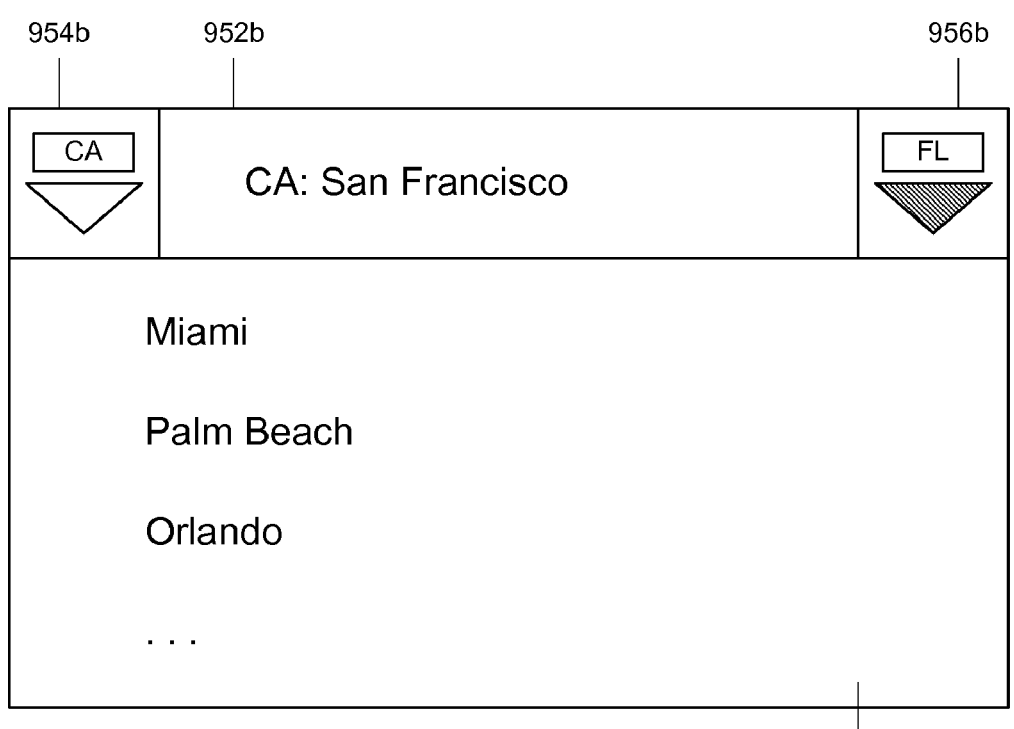
FIG. 15B illustrates an exemplary graphical user interface control according to the embodiment of FIG. 15A. A different drop-down list is shown in the figure.

With reference now to FIG. 15, another exemplary graphical user interface (GUI) component 952 according to an embodiment of the present invention is illustrated. In this particular example, two lists (e.g., cities from California and cities from Florida, 958*a* and 958*b*, respectively) are to be displayed through this GUI control. The exemplary control comprises two separate buttons 954 and 956 (e.g., one for California and one for Florida). Activating one button opens/closes the corresponding list (or, replaces the currently open list, etc.). In FIG. 15A, the widget 952*a* currently displays the California city list 958*a*, whereas in FIG. 15B, the widget 952*b* currently displays the Florida city list 958*b*. The buttons have different visual representations depending on the selection. (For example, buttons 954*a* and 956*b* are activated in FIGS. 15A and 15B, respectively. The other buttons, e.g., 956*a* in the top figure and 954*b* in the bottom figure, are drawn in "normal" states.) In a certain embodiment of the present invention, for example, as shown in this example, the selected item may be displayed with additional information (e.g., the prefix "CA" in this example) to indicate the list to which the item belongs. If an item Palm Beach is selected, the display on the edit box 952 may be changed to "FL: Palm Beach" in this particular example.

Figure 16A:
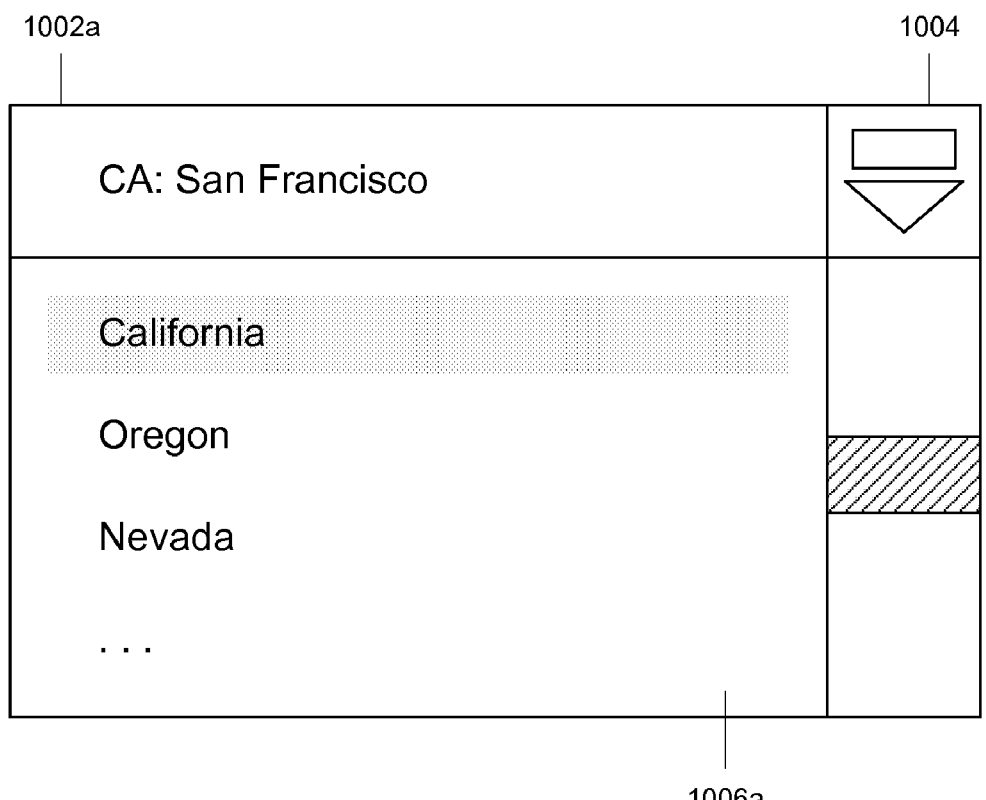
FIG. 16A illustrates an exemplary graphical user interface control according to an embodiment of the present invention. The lists are hierarchically organized in this exemplary embodiment.
Figure 16B:
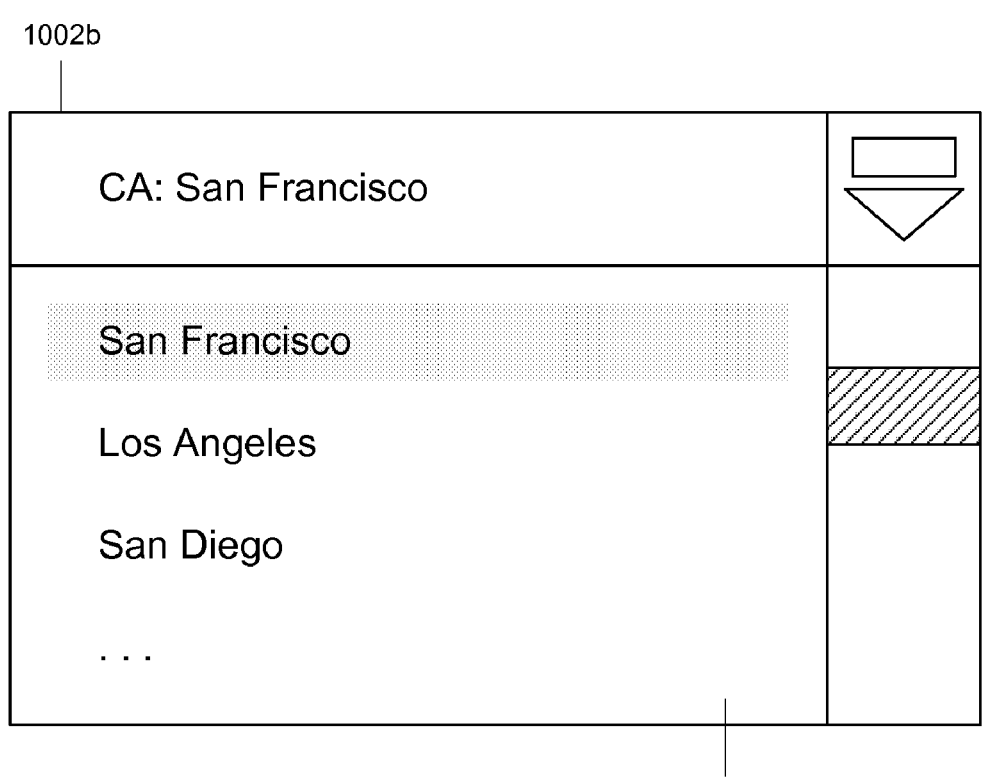
FIG. 16B illustrates an exemplary graphical user interface control according to the embodiment of FIG. 16A. The lists are hierarchically organized in this exemplary embodiment.

According to some embodiments of the present invention, hierarchically organized lists (or, hierarchically organized data) may be used with certain multi-list GUI widgets (e.g., categories, subcategories, leaf items, etc.). In the example shown in FIG. 16, a city in the United States may be selected by first selecting a state and then selecting one of the cities in that state. FIG. 16A shows the exemplary widget 1002*a* with the state list 1006*a* according to an embodiment of the present invention. The widget further includes a button 1004 for opening/closing/alternating lists, etc. Once a selection is made at a top (or, upper) level (e.g., a category), another list (compatible with the top/upper level selection, e.g., items in the selected category) is displayed, whose selection may prompt to display another lower level list, etc. In this illustration, California has been selected, and a list of cities in California 1006*b* is displayed in a different widget state 1002*b* as shown in FIG. 16B. This state change may be triggered, for example, by the user selecting a different item in the list 1006*a*. Once a selection is completed (e.g., in multiple levels), the list part may be closed. Selecting an Internet host/domain name is another example which can be implemented in a user-friendly way using a hierarchically organized multi-list combo box. For example, a user can select the top level domain first (e.g., .com, .net, etc.), which triggers displaying the second level (e.g., abc.com, cnn.com, Yahoo.com, etc. if .com has been selected), and so forth.

Accordingly, methods and apparatuses of operating a graphical user interface for a data processing system, in particular, a combo-box widget with multiple selection lists, have been provided. While the above description contains many specificities, these should not be construed as limitations on the scope of the invention, but as exemplifications of the presently preferred embodiments thereof. Many other ramifications and variations are possible within the teachings of the invention. As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable storage medium may be utilized including hard disks, CD-ROMs, DVD-ROMs, optical storage devices, or magnetic storage devices. Thus the scope of the invention should be determined by the appended claims and their legal equivalents, and not by the examples given.

What is claimed is:

1. A data processing system, the data processing system having a graphical user interface, the data processing system comprising:
    a bus;
    a display device coupled to said bus, said display device being configured for displaying the graphical user interface;
    a memory coupled to said bus, said memory being configured for storing data, wherein said data comprises a plurality of lists of items, said plurality of lists of items comprising a first list of items and a second list of items, said first list of items comprising a first item, said second list of items comprising a second item, said first item being different from said second item; and
    a processing unit coupled to said bus, wherein said processing unit is configured for displaying, on the graphical user interface, a graphical user interface widget, said graphical user interface widget being configured to be in one of a plurality of widget states, said plurality of widget states comprising at least one closed state and a plurality of open states, said graphical user interface widget being in a first widget state from said plurality of widget states, said graphical user interface widget comprising:
        a first part, said first part being configured to be always in a first visible state regardless of said first widget state, wherein said first part comprises an edit box, said edit box being configured for displaying an item from said plurality of lists of items, wherein said first part further comprises a button area, said button area being configured for receiving a user input; and
        a second part, said second part being configured to be in a second visible state or a hidden state, wherein said second part is configured to be in said hidden state if said first widget state is a closed state from said at least one closed state and said second part is configured to be in said second visible state if said first widget state is an open state from said plurality of open states, said second part comprising a dropdown list box, said dropdown list box being configured, if said second part is in said second visible state, for displaying at least one item from said plurality of lists of items, wherein said graphical interface widget is configured to switch states, in response to a first user input received through said button area, from said first widget state to a second widget state from said plurality of widget states, said second widget state being distinct from said first widget state, wherein said graphical interface widget is configured to switch states, in response to a second user input received through said button area, from said first widget state to a third widget state from said plurality of widget states, said third widget state being distinct from said first widget state, said third widget state being distinct from said second widget state, said first user input being different from said second user input, wherein said dropdown list box is configured for displaying, in said second widget state, at least said first item in said dropdown list box if said second part is in said visible state, and wherein said dropdown list box is configured for displaying, in said third widget state, at least said second item in said dropdown list box if said second part is in said visible state.

2. The data processing system of claim 1, wherein:
said item displayed in said edit box belongs to one of said first list of items or said second list of items.

3. The data processing system of claim 1, wherein:
another item is displayed in said edit box in response to a user selecting said another item from a list of items displayed in said dropdown list box.

4. The data processing system of claim 1, wherein:
said dropdown list box is configured to be always in said second visible state regardless of said first widget state.

5. The data processing system of claim 1, wherein:
said first item corresponds to a category and wherein said second item in said second list of items belongs to said category.

6. The data processing system of claim 1, said graphical user interface widget further comprising:
a label, said label being configured for displaying an indicator of a currently displayed list of items in said dropdown list box.

7. The data processing system of claim 1, wherein:
said edit box comprises a text item, said text item being uneditable by a user, and wherein said first part being configured for receiving a user input.

8. The data processing system of claim 1, wherein:
said first user input comprises a mouse button click event.

9. The data processing system of claim 1, wherein:
said plurality of lists of items are ordered in a predefined order, said first list of items being before said second list of items according to said predefined order.

10. A method for enabling a user to select at least one item on a graphical user interface of a data processing system, the method comprising:
    displaying a first representation of a widget on the graphical user interface, said widget comprising a dropdown list box, said widget being configured for displaying, in said dropdown list box, at least one item from a list of items, said list of items being selected from a plurality of lists of items, said plurality of lists of items comprising a first list of items, wherein first at least one item from said first list of items is displayed, in said dropdown list box, in said first representation;
    receiving, when said widget is displayed in said first representation, a first user input;
    displaying, in response to said first user input, a second representation of said widget on the graphical user interface, wherein said dropdown list box is hidden in said second representation;
    receiving, when said widget is displayed in said second representation, a second user input;
    determining, in response to said second user input, a second list of items to display next from said plurality of lists of items, said second list of items being different from said first list of items; and
    displaying, based on said determining, a third representation of said widget on the graphical user interface, wherein second at least one item from said second list of items is displayed, in said dropdown list box, in said third representation.

11. The method of claim 10, wherein:
said widget further comprises an edit box, wherein an item is displayed in said edit box upon selecting said item from one list of items from said plurality of lists of items.

12. The method of claim 10, further comprising:
receiving, when said widget is displayed in said third representation, a third user input;
selecting, in response to said third user input, an item from said second list of items; and
displaying, based on said selecting, said item in an edit box of said widget.

13. The method of claim 12, further comprising:
performing at least one operation based on the selected item in said edit box.

14. The method of claim 10, wherein:
said widget further comprises a button, and wherein said first user input comprises a button click event on said button.

15. The method of claim 10, wherein:
said plurality of lists of items are ordered in a predefined order, and wherein said determining comprises selecting said second list of items according to said predefined order.

* * * * *